United States Patent
Tanaka

(10) Patent No.: US 8,891,985 B2
(45) Date of Patent: Nov. 18, 2014

(54) BIAS POWER SUPPLY DEVICE AND IMAGE FORMING APPARATUS

(71) Applicant: Fuji Xerox Co., Ltd., Tokyo (JP)

(72) Inventor: Koya Tanaka, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 148 days.

(21) Appl. No.: 13/722,120

(22) Filed: Dec. 20, 2012

(65) Prior Publication Data

US 2013/0330094 A1 Dec. 12, 2013

(30) Foreign Application Priority Data

Jun. 6, 2012 (JP) ................... 2012-128999

(51) Int. Cl.
*G03G 21/20* (2006.01)
*G03G 15/00* (2006.01)
*H02M 3/24* (2006.01)
*G03G 15/02* (2006.01)

(52) U.S. Cl.
CPC .............. *G03G 15/0283* (2013.01); *H02M 3/24* (2013.01)
USPC ............................................. 399/44; 399/89

(58) Field of Classification Search
CPC  G03G 15/0283; G03G 15/5004; G03G 21/20
USPC .............................................. 399/44, 88, 89
See application file for complete search history.

(56) References Cited

U.S. PATENT DOCUMENTS 5,365,316 A 11/1994 Motoyama et al.
5,444,519 A 8/1995 Motoyama et al.
8,244,150 B2 * 8/2012 Kumada et al. ................. 399/69

FOREIGN PATENT DOCUMENTS

JP 3359111 B2 12/2002
JP 2012-063416 A 3/2012

* cited by examiner

*Primary Examiner* — Hoang Ngo
(74) *Attorney, Agent, or Firm* — Sughrue Mion, PLLC

(57) ABSTRACT

A bias power supply device includes: a temperature detecting unit; a control signal generation unit generating and outputting an output frequency setting signal for setting a frequency of an alternating current power in accordance with a repetition frequency and a resonance frequency signal being set at a lower or higher repetition frequency according to the measured temperature; a waveform signal generation circuit generating a waveform signal for pulse-width modulation having a time constant for rising set by capacity and resistance based on the resonance frequency signal; a modulation circuit generating a pulse-width-modulated modulation signal based on the waveform signal and the output frequency setting signal; a switching circuit driven by the modulation signal; and a transformer having a first winding and a second winding, and supplying an alternating current power with a repetition frequency of the output frequency setting signal to an external load connected to the second winding.

6 Claims, 8 Drawing Sheets

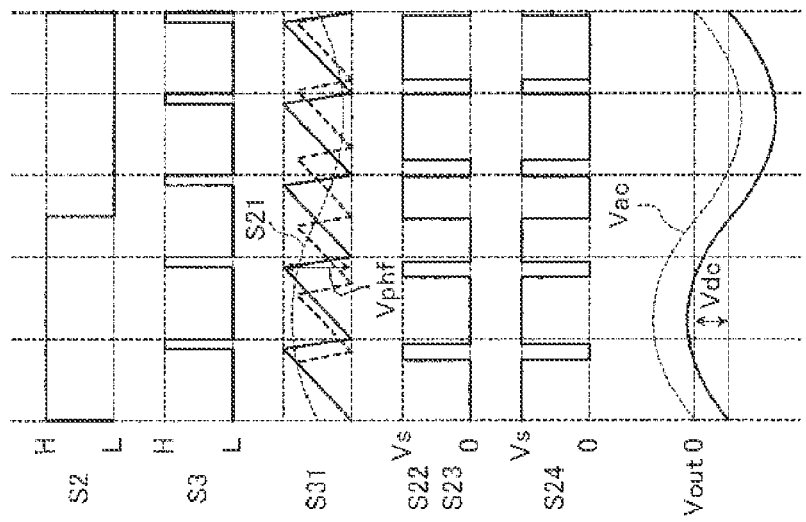
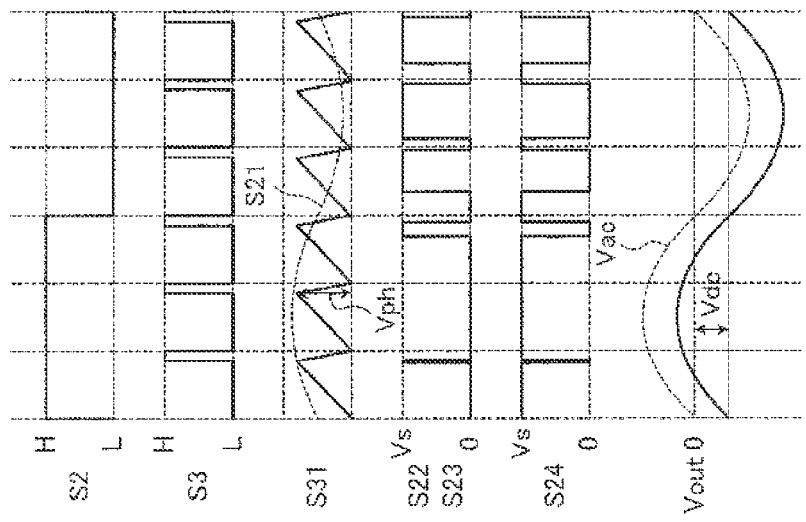
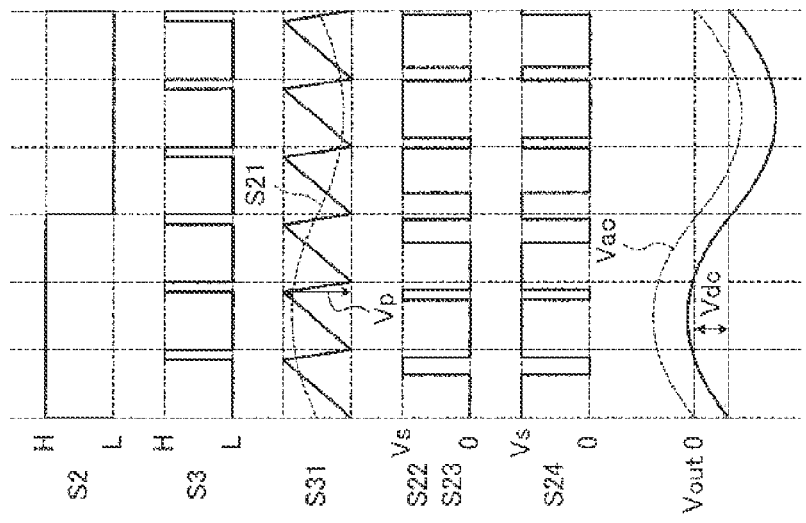

FIG.8

| MEMORY ADDRESS | RESONANCE FREQUENCY SIGNAL S3 (SPECIFIC EXAMPLE) | TEMPERATURE T |
|---|---|---|
| #1 | F1 (60 kHz) | 20°C ≦ T < 40°C |
| #2 | F2 (54 kHz) | 40°C ≦ T ≦ 50°C |
| #3 | F3 (66 kHz) | 10°C ≦ T < 20°C |

US 8,891,985 B2

BIAS POWER SUPPLY DEVICE AND IMAGE FORMING APPARATUS

CROSS REFERENCE TO RELATED APPLICATIONS

This application is based on and claims priority under 35 USC §119 from Japanese Patent Application No. 2012-128999 filed Jun. 6, 2012.

BACKGROUND

1. Technical Field

The present invention relates to a bias power supply device and an image forming apparatus.

2. Related Art

In an image forming apparatus such as an electrophotographic copying machine, an electrostatic latent image is formed on a photoconductive drum, a toner image is formed by developing the electrostatic latent image, and thereafter, the toner image is transferred onto a recording sheet or the like. In such an image forming apparatus, the surface of the photoconductive drum is charged to a predetermined potential (charging bias) to form the electrostatic latent image on the photoconductive drum. Moreover, a predetermined potential (developing bias) is applied to a developing unit to form the toner image by developing the electrostatic latent image formed on the photoconductive drum. For generation of such a charging bias or a developing bias, bias power supply devices of a harmonic modulation method have been used. The bias power supply devices of the harmonic modulation method are very effective in energy savings.

SUMMARY

According to an aspect of the present invention, there is provided a bias power supply device including: a temperature detecting unit that measures a temperature; a control signal generation unit that generates and outputs an output frequency setting signal and a resonance frequency signal, the output frequency setting signal setting a frequency of an alternating current power in accordance with a repetition frequency, and the resonance frequency signal, in a case where the temperature measured by the temperature detecting unit corresponds to a higher temperature range of at least two predetermined temperature ranges, being set at a repetition frequency lower than a repetition frequency in a case of the measured temperature corresponding to a lower temperature range, and in a case where the temperature measured by the temperature detecting unit corresponds to the lower temperature range, being set at a repetition frequency higher than a repetition frequency in a case of the measured temperature corresponding to a higher temperature range; a waveform signal generation circuit that generates a waveform signal to be used for pulse-width modulation, in which a time constant for rising is set by capacity and resistance based on the resonance frequency signal; a modulation circuit that generates a modulation signal having been pulse-width modulated based on the waveform signal and the output frequency setting signal; a switching circuit that is driven based on the modulation signal; and a transformer provided with a first winding and a second winding, in which the switching circuit is connected to the first winding and a load provided outside is connected to the second winding, the transformer supplying an alternating current power with a repetition frequency of the output frequency setting signal to the load through the second winding.

BRIEF DESCRIPTION OF THE DRAWINGS

An exemplary embodiment of the present invention will be described in detail based on the following figures, wherein:

FIGS. 6A to 6C are timing charts illustrating the operations of the bias power supply device in a case where a temperature in the bias power supply device becomes higher than a predetermined temperature;

FIG. 8 is a diagram showing a specific example of a reference table for changing a repetition frequency of a resonance frequency signal in response to the temperature.

DETAILED DESCRIPTION

Hereinafter, an exemplary embodiment according to the present invention (the exemplary embodiment) will be described in detail with reference to the attached drawings.

<Image Forming Apparatus 1>

Figure 1:
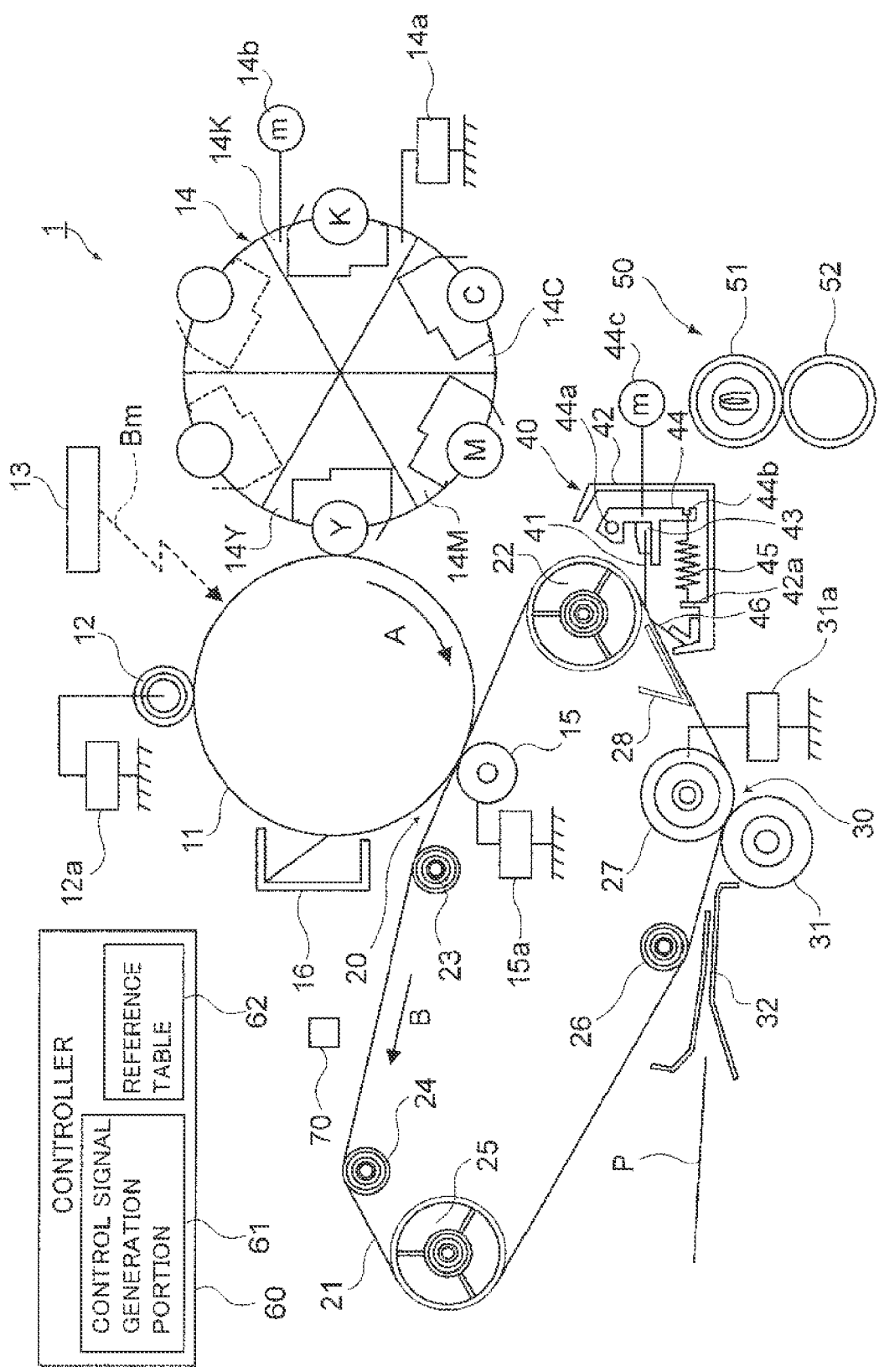
FIG. 1 is a diagram showing an example of an entire configuration of an image forming apparatus to which the exemplary embodiment is applied.

FIG. 1 is a diagram showing an example of an entire configuration of an image forming apparatus 1 to which the exemplary embodiment is applied.

The image forming apparatus 1 shown in FIG. 1 is an image forming apparatus generally called a multiple type. The image forming apparatus 1 includes: a photoconductive drum 11 as an example of an image carrier that is provided rotatably in a direction of an arrow A; a primary transfer portion 20 that sequentially transfers (primarily transfers) toner images of respective color components formed on the photoconductive drum 11 onto an intermediate transfer belt 21 that is provided rotatably in a direction of an arrow B; a secondary transfer portion 30 as an example of a transfer unit that collectively transfers (secondarily transfers) superimposed images transferred to the intermediate transfer belt 21 onto a sheet P as an example of a transfer-receiving body; a fixing portion 50 as an example of a fixing unit that fixes an image having been secondarily transferred onto the sheet P; and a controller 60 that controls each mechanical portion in the image forming apparatus 1. Further, the image forming apparatus 1 includes a sensor 70 as an example of a temperature detecting unit that measures a temperature or the like.

Around the photoconductive drum 11, there are sequentially provided devices for electrophotography such as: a charging roll 12 that charges the photoconductive drum 11; a laser exposure device 13 as an example of an exposure unit that writes an electrostatic latent image to the photoconductive drum 11 (in the figure, an exposure beam is indicated by a symbol Bm); a rotary developing device 14 to which developing units 14Y, 14M, 14C and 14K, which contain toner of color components of yellow (Y), magenta (M), cyan (C) and black (K), respectively, and visualize the electrostatic latent image on the photoconductive drum 11 by the toner, are rotatably attached; a primary transfer roll 15 used for primary transfer to transfer the toner images of the respective color components formed on the photoconductive drum 11 onto the intermediate transfer belt 21; a refresher 16 that temporarily reclaims toner, of remaining toner, charged to a polarity opposite to a normal polarity; and the like.

Here, the charging roll 12 is formed by forming, for example, an epichlorohydrin rubber layer on a surface of a metal shaft, and further coating the surface of the epichlorohydrin rubber layer with polyamide containing conductive powder of tin oxide to the thickness of about 3 μm. Moreover, the refresher 16 is, for example, a brush made by bundling nylon fibers provided with conductivity.

Further, the photoconductive drum 11 is made by forming, for example, an organic photoconductive layer on a thin-walled cylindrical drum made of metal, and is configured so that the organic photoconductive layer is charged to a negative polarity. The rotary developing device 14 has four developing units of 14Y, 14M, 14C and 14K. Development by the developing units 14Y, 14M, 14C and 14K is performed according to a reversal developing method. Consequently, the toner used in the developing units 14Y, 14M, 14C and 14K is of a negative charge type. A charging bias power supply 12a for applying a charging bias to the photoconductive drum 11 is connected to the charging roll 12 and a developing bias power supply 14a for applying a developing bias to each of the developing units 14Y, 14M, 14C and 14K is connected to the rotary developing device 14. Moreover, a developing device driving motor 14b for causing a predetermined developing unit to face the photoconductive drum 11 by rotation is attached to the rotary developing device 14. It should be noted that the photoconductive drum 11 is grounded.

It should be noted that the voltage outputted by the charging bias power supply 12a for providing a charging bias to the charging roll 12 of the photoconductive drum 11 is generated by, for example, superimposing a direct current (DC) voltage of −600V upon an alternating current (AC) voltage having a frequency of 2 kHz and a peak-to-peak value (p-p value) of 2 kV. Moreover, the voltage outputted by the developing bias power supply 14a for providing a developing bias to each of the developing units 14Y, 14M, 14C and 14K is generated by, for example, superimposing a DC voltage of −500V upon an AC voltage having a frequency of 8 kHz and a p-p value of 1 kV.

Here, the photoconductive drum 11, the charging roll 12 and the charging bias power supply 12a are an example of a charging unit. Further, the developing units 14Y, 14M, 14C and 14K and the developing bias power supply 14a are an example of a developing unit.

The intermediate transfer belt 21 is configured to be looped over plural (in FIG. 1, six) rolls 22 to 27. Of these, the rolls 22 and 26 are following rolls, the roll 23 is an idle roll that is made of metal and is used for positioning the intermediate transfer belt 21 or forming a flat surface for primary transfer, the roll 24 is a tension roll that is used for keeping a tension of the intermediate transfer belt 21 constant, the roll 25 is a driving roll of the intermediate transfer belt 21, and the roll 27 is a backup roll for secondary transfer (hereinafter, referred to as a backup roll 27). In addition, the intermediate transfer belt 21 is made of a resin such as polyimide, polycarbonate, polyester, polypropylene, polyethylene terephthalate, acryl, polyvinyl chloride and the like, or various kinds of rubbers containing a proper amount of carbon black as a conductive agent, and for example, a surface resistivity thereof is $10^{11}$ Ω/square, a volume resistivity thereof is $10^{11}$Ω·cm, and a thickness thereof is 150 μm.

The primary transfer portion 20 is configured with the photoconductive drum 11, the primary transfer roll 15 arranged on an opposite side of a toner image carrying surface of the intermediate transfer belt 21 and the like. To the primary transfer roll 15, a primary transfer bias power supply 15a for applying a primary transfer bias is connected.

The secondary transfer portion 30 is configured with a secondary transfer roll 31 arranged on a toner image carrying surface side of the intermediate transfer belt 21 and the backup roll 27, and the like. The backup roll 27 is formed of a tube of a rubber made by blending EPDM and NBR dispersing carbon on the surface side thereof and is formed of an EPDM rubber on the inside thereof, formed so that the surface resistivity thereof becomes 7 log Ω/square to 10 log Ω/square, and the hardness thereof is set to, for example, 70° (by Asker C). A secondary transfer bias power supply 31a for applying a secondary transfer bias voltage is connected to the backup roll 27. On the other hand, the secondary transfer roll 31 is grounded. In addition, a sheet transport guide 32 for guiding a sheet P being transported to the secondary transfer portion 30 is attached to an upstream side of the secondary transfer portion 30.

On the other hand, a belt cleaner 40 that removes remaining toner attached on the intermediate transfer belt 21 after the secondary transfer is provided on a downstream side of the secondary transfer portion 30, and a sheet-metal member 28 is arranged along the inner surface of the intermediate transfer belt 21 at a position facing the belt cleaner 40 with the intermediate transfer belt 21 interposed therebetween. The belt cleaner 40 includes a scraper 41 that is configured with a stainless plate or the like and is provided on the toner image carrying surface side of the intermediate transfer belt 21, and a cleaner housing 42 that accommodates the scraper 41. Moreover, one end portion of the scraper 41 is caught by a block 43 to be fastened. The block 43 is attached to a holder 44 that swings around a shaft 44a. Further, between a recessed portion 44b provided at a lower end side of the holder 44 and a projection portion 42a provided at a lower portion of the cleaner housing 42, a spring 45 for pressing the scraper 41 toward the intermediate transfer belt 21 is attached so that the scraper 41 contacts the intermediate transfer belt 21. On the upstream side in a moving direction of the intermediate transfer belt 21 as viewed from the scraper 41, a film seal 46 for suppressing scattering of the removed foreign materials to the outside is attached.

Moreover, the holder 44 is able to be pulled in a direction opposite to the pressing direction of the spring 45 or pressing thereof is able to be canceled by a not-shown cam connected to a cleaner driving motor 44c, thereby causing the scraper 41 to contact or to be separated from the intermediate transfer belt 21. In the exemplary embodiment, in a case where a color image including plural colors is formed, the secondary transfer roll 31 and the belt cleaner 40 are configured to be separated from the intermediate transfer belt 21 until a toner image of a color before the last color passes through these secondary transfer roll 31 and the belt cleaner 40.

Further, the fixing portion 50 includes a heat roll 51 integrating a heat source such as a halogen lamp and a pressure roll 52 pressed against the heat roll 51, and is configured to carry out fixing by causing a sheet P onto which a toner image has been transferred to pass through a fixing nip region formed between the heat roll 51 and the pressure roll 52.

Still further, the sensor 70 measures a temperature or the like in each of the above-described mechanical portions and transmits the measured data to the controller 60. As the data to be measured, temperature, humidity, vibration, dust so forth are provided. The temperature and humidity are prone to have effects on operations of the above-described mechanical portions. In addition, in a case where the humidity can be estimated from the temperature, the humidity may be provided on the analogy of the temperature. It should be noted that, hereinafter, descriptions assume that temperature is measured. The sensor 70 for measuring the temperature is configured with a thermocouple or the like.

Moreover, plural sensors 70 may be arranged at plural respective positions in the image forming apparatus 1.

It should be noted that the sensor 70 may be provided in proximity to at least one of the charging bias power supply 12a and the developing bias power supply 14a. In particular, in a case where at least one of the charging bias power supply 12a and the developing bias power supply 14a is provided near the fixing portion 50, in which temperature change is apt to occur by heating, the sensor 70 may be provided around at least one of the charging bias power supply 12a and the developing bias power supply 14a provided near the fixing portion 50. In addition, in the charging bias power supply 12a or the developing bias power supply 14a, the sensor 70 may also be provided in proximity to a member having a property that is prone to be changed by the temperature, such as a condenser C30 of a saw-tooth wave generation circuit 1204, in which variations in the output by the temperature is desirably suppressed (refer to FIG. 4 to be described later).

In other words, the sensor 70 may be provided at a place for measuring the temperature of each mechanical portion, namely, periphery or surroundings of each mechanical portion to make it possible to measure the temperature in the environment where each mechanical portion is placed.

The controller 60 includes a control signal generation portion 61 that generates and transmits plural controlling signals (an alternating current setting signal S1, an output frequency setting signal S2, a resonance frequency signal S3 and a direct current setting signal S4 in FIGS. 2 and 3 to be described later) to the charging bias power supply 12a and the developing bias power supply 14a to be described later. The controller 60 also includes a reference table 62 for setting the controlling signals to be transmitted to the charging bias power supply 12a and the developing bias power supply 14a in response to the temperature measured by the sensor 70.

It should be noted that at least one of the control signal generation portion 61 and the reference table 62 or both of them may be provided outside of the controller 60.

Next, an image forming process of the image forming apparatus 1 shown in FIG. 1 will be described. When a starting switch not shown in the figure is turned on, the image forming process is carried out. First, the surface of the photoconductive drum 11 is charged to the charging bias by the charging roll 12, and then, an electrostatic latent image corresponding to an image is written thereto by the laser exposure device 13. Next, the electrostatic latent image is developed by corresponding one of the developing units 14Y, 14M, 14C and 14K, to which a developing bias has been applied. For example, if the electrostatic latent image written to the photoconductive drum 11 corresponds to yellow (Y), the electrostatic latent image is developed by the developing unit 14Y containing yellow (Y) toner, and thereby a toner image of yellow (Y) is formed on the photoconductive drum 11.

It should be noted that the reversal developing method is adopted here. As described above, the surface of the photoconductive drum 11 is charged to the charging bias (for example, a DC voltage of −600V) by the charging roll 12. When an image is written by the laser exposure device 13, an electric conductivity of the surface of the photoconductive drum 11 becomes higher, and a potential of the surface of the portion irradiated with laser light becomes, for example, the DC voltage of −200V from −600V. On the other hand, to corresponding one of the developing units 14Y, 14M, 14C and 14K, the developing bias (for example, a DC voltage of −400V) is applied. Then, the negative charge type toner is attached to the portion where the surface potential of the photoconductive drum 11 is −200V. In this manner, the toner image is formed.

The toner image formed on the photoconductive drum 11 is subjected to primary transfer from the photoconductive drum 11 to the intermediate transfer belt 21 by a primary transfer bias applied to the primary transfer roll 15 at the primary transfer portion 20 where the photoconductive drum 11 and the intermediate transfer belt 21 contact with each other. On the other hand, the toner remaining on the photoconductive drum 11 after the primary transfer is mechanically leveled off as well as negatively (in the exemplary embodiment, positive) charged toner is removed by the refresher 16.

At this time, in a case where a monochrome image is to be formed, the toner image primarily transferred onto the intermediate transfer belt 21 is immediately subjected to the secondary transfer onto a sheet P. On the other hand, in a case where a color image superimposing toner images of plural colors is to be formed, formation of the toner image on the photoconductive drum 11 and primary transfer of the toner image formed on the photoconductive drum 11 is repeated many times as the number of colors. For example, in a case where a full color image superimposing toner images of four colors is to be formed, toner images of yellow (Y), magenta (M), cyan (C) and black (K) are sequentially formed on the photoconductive drum 11, and these toner images of the respective colors are sequentially subjected to the primary transfer onto the intermediate transfer belt 21. Whereas, the intermediate transfer belt 21 rotates with the same cycle as the photoconductive drum 11 while carrying the toner image having been primarily transferred, and thereby each of the toner images of yellow (Y), magenta (M), cyan (C) and black (K) is transferred onto the intermediate transfer belt 21 every one rotation thereof to be superimposed.

The toner image thus primarily transferred onto the intermediate transfer belt 21 is transported to the secondary transfer portion 30 with the rotation of the intermediate transfer belt 21. On the other hand, a sheet P is supplied to the secondary transfer portion 30 with a predetermined timing by a registration roll which is not shown through the sheet transport guide 32, and is nipped between the intermediate transfer belt 21 and the secondary transfer roll 31. Then, at the secondary transfer portion 30, the toner image carried on the intermediate transfer belt 21 is electrostatically transferred onto the sheet P by the action of a secondary transfer electric field between the secondary transfer roll 31 and the backup roll 27. Thereafter, the sheet P onto which the toner image is transferred is transported to the fixing portion 50 and the toner image on the sheet P is fixed by heat and pressure. On the other hand, remaining toner on the intermediate transfer belt 21 passed through the secondary transfer portion 30 is removed by the belt cleaner 40.

<Bias Power Supply Device 100> [Block Configuration of Bias Power Supply Device 100]

Figure 2:
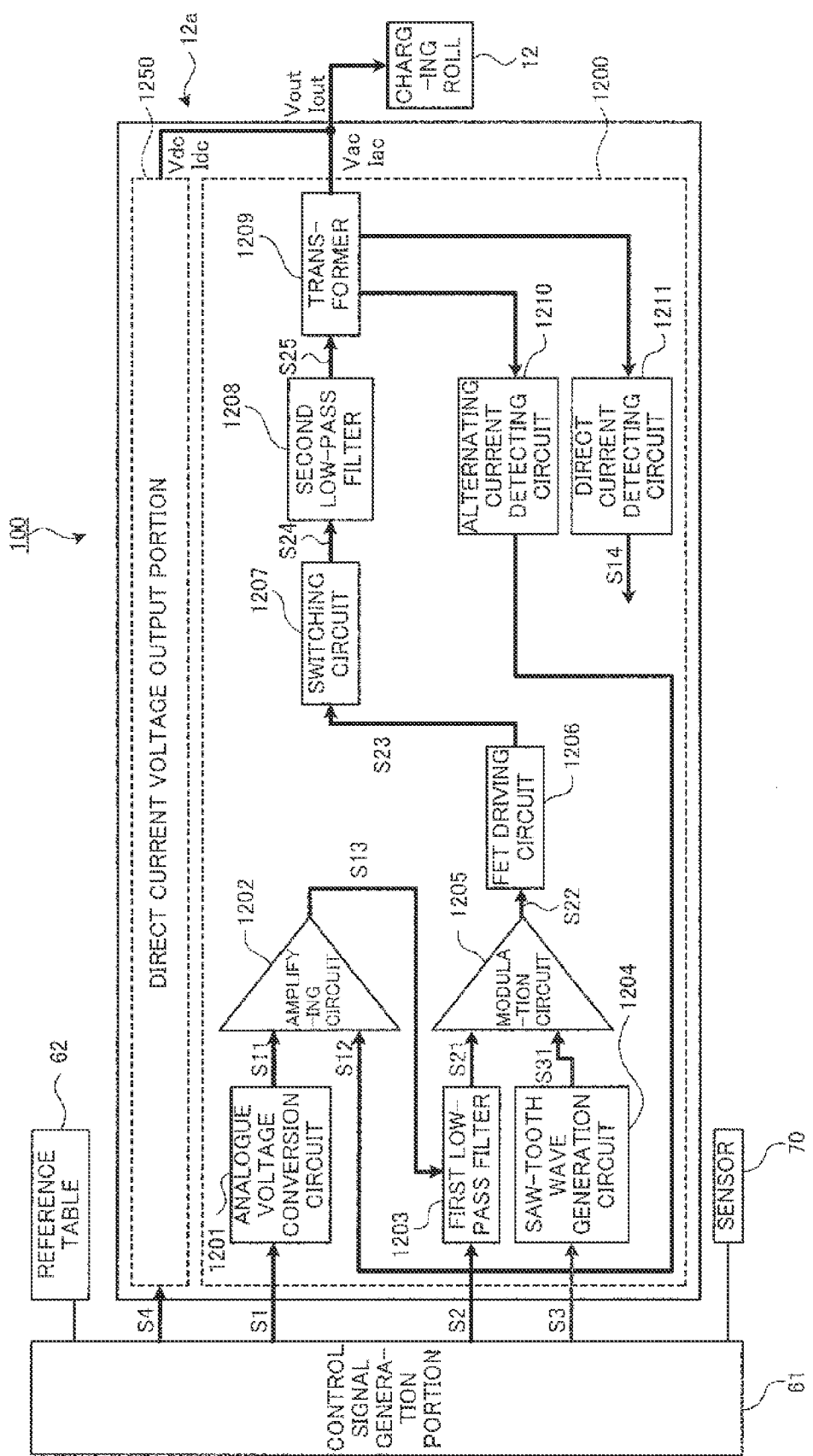
FIG. 2 is a diagram showing an example of a block configuration of a bias power supply device in the exemplary embodiment.

FIG. 2 is a diagram showing an example of a block configuration of a bias power supply device 100 in the exemplary embodiment. It should be noted that a flow of a signal is indicated by an arrow. The bias power supply device 100 in the exemplary embodiment is applicable to at least one of the charging bias power supply 12a and the developing bias power supply 14a. Here, a description will be given by taking a case where the bias power supply device 100 is applied to the charging bias power supply 12a as a specific example. In this case, it is assumed that the bias power supply device 100 includes the charging bias power supply 12a, the control signal generation portion 61 and the sensor 70.

The charging bias power supply 12a includes an alternating current voltage output portion 1200 that outputs an alternating current and a direct current voltage output portion 1250 that outputs a direct current. The alternating current voltage output portion 1200 and the direct current voltage output portion 1250 are switching power supplies that generate high voltage by switching a switching element. It should be noted that the alternating current voltage output portion 1200 is of an external commutation system and the direct current voltage output portion 1250 is of a self-commutation system. However, the direct current voltage output portion 1250 may adopt the external commutation system.

Consequently, the bias power supply device 100 includes the alternating current voltage output portion 1200, the direct current voltage output portion 1250, the control signal generation portion 61 and the sensor 70.

The alternating current voltage output portion 1200 includes: an analogue voltage conversion circuit 1201; an amplifying circuit 1202; a first low-pass filter 1203; the saw-tooth wave generation circuit 1204 as an example of a waveform signal generation circuit that generates a waveform signal (in the exemplary embodiment, a saw-tooth wave signal) used for pulse-width modulation; a modulation circuit 1205; an FET (field effect transistor) driving circuit 1206; a switching circuit 1207; a second low-pass filter 1208; a transformer 1209; an alternating current detecting circuit 1210; and a direct current detecting circuit 1211. It should be noted that a configuration of the direct current voltage output portion 1250 is omitted in FIG. 2, and is illustrated in FIG. 3 to be described later.

The analogue voltage conversion circuit 1201 receives the alternating current setting signal S1 transmitted from the control signal generation portion 61 as an input. The alternating current setting signal S1 is a pulse-width modulation (PWM) signal for setting, for example, a current value of an alternating (sine wave) current Iac outputted from the transformer 1209 in accordance with a duty ratio. The duty ratio is, for example, 3% to 100%. Then the analogue voltage conversion circuit 1201 generates and outputs a signal of an analogue voltage (hereinafter, referred to as an analogue voltage signal S11) corresponding to the duty ratio of the inputted alternating current setting signal S1.

It should be noted that, in the case where the bias power supply device 100 is applied to the charging bias power supply 12a, the alternating current setting signal S1 is assumed to be a signal for setting a value of the alternating current Iac outputted by the transformer 1209. However, in a case where the bias power supply device 100 is applied to the developing bias power supply 14a, the alternating current setting signal S1 may be a signal for setting a value of the alternating current voltage Vac outputted by the transformer 1209.

In this manner, the alternating current setting signal S1 may be a signal that sets any of the value of the alternating current Iac and the value of the alternating current voltage Vac. This will be described in detail together with the alternating current detecting circuit 1210 and the direct current detecting circuit 1211.

Hereinafter, a description will be given on an assumption that the alternating current setting signal S1 is a signal for setting a value of the alternating current Iac outputted by the transformer 1209.

The amplifying circuit 1202 receives the analogue voltage signal S11 outputted from the analogue voltage conversion circuit 1201 and a voltage signal S12 outputted from the alternating current detecting circuit 1210 as the input. It should be noted that the alternating current detecting circuit 1210 will be described later. The amplifying circuit 1202 amplifies the difference in potential between the analogue voltage signal S11 and the voltage signal S12 to generate an error amplifying signal S13 as an output.

The first low-pass filter 1203 receives the output frequency setting signal S2 outputted from the control signal generation portion 61 as an input, and also receives the error amplifying signal S13 outputted from the amplifying circuit 1202 as an input. The output frequency setting signal S2 is a signal having a duty ratio of 50% and determines the frequency of the alternating current voltage Vac and the alternating current Iac outputted from the transformer 1209. In other words, the frequency of the alternating current voltage Vac and the alternating current Iac outputted from the transformer 1209 coincides with a repetition frequency (=1/cycle) of the output frequency setting signal S2. It should be noted that, since the frequency of the alternating current Iac and the frequency of the alternating current voltage Vac coincide with each other, the alternating current voltage Vac is described hereinafter, but the description of the alternating current Iac is omitted.

The first low-pass filter 1203 extracts an alternating current component from the output frequency setting signal S2 and causes the component to pass the low-pass filter to interrupt a high-frequency component and generate a sine wave signal S21 as an output. It should be noted that an amplitude (p-p value) of the sine wave signal S21 is set by the error amplifying signal S13.

The saw-tooth wave generation circuit 1204 receives the resonance frequency signal S3 outputted from the control signal generation portion 61 as an input, and converts the resonance frequency signal S3 into a saw-tooth wave signal S31 as an output. The resonance frequency signal S3 sets the repetition frequency of the saw-tooth wave signal S31.

It should be noted that the frequency of the resonance frequency signal S3 is set based on the temperature measured by the sensor 70. As will be described later, the frequency of the resonance frequency signal S3 may also be set with reference to the reference table 62 based on the temperature measured by the sensor 70.

The modulation circuit 1205 receives the sine wave signal S21 outputted from the first low-pass filter 1203 and the saw-tooth wave signal S31 outputted from the saw-tooth wave generation circuit 1204 as an input. The modulation circuit 1205 makes a comparison between the potential of the sine wave signal S21 and the potential of the saw-tooth wave signal S31 to generate a modulation signal S22 as an output with different potentials between a period in which the potential of the saw-tooth wave signal S31 is higher than the potential of the sine wave signal S21 and a period in which the potential of the saw-tooth wave signal S31 is lower than the potential of the sine wave signal S21. In other words, the modulation signal S22 is a PWM signal whose pulse width is set in accordance with a difference in potential between the saw-tooth wave signal S31 and the sine wave signal S21.

The FET driving circuit 1206 receives the modulation signal S22 outputted from the modulation circuit 1205 as an input, and generates a driving signal S23 for driving the switching circuit 1207 as an output. The modulation signal S22 is a PWM signal, and the driving signal S23 is also a PWM signal.

The switching circuit 1207 receives the driving signal S23 outputted from the FET driving circuit 1206 as an input, and outputs a switching output signal S24. The switching circuit 1207 is configured with two electric field effect transistors FET1 and FET2 as a switching element, as will be described later (refer to FIG. 3 to be described later). Since the driving signal S23 is a PWM signal, the electric field effect transistors FET1 and FET2 of the switching circuit 1207 repeat turning on and off alternately. Accordingly, the switching output signal S24 outputted by the switching circuit 1207 is also a PWM signal that follows the driving signal S23.

The second low-pass filter 1208 causes the switching output signal S24 outputted from the switching circuit 1207 to pass through a low-pass filter to generate a sine wave output signal S25, in which a sine wave is formed by interrupting a high-frequency component, as an output.

The transformer 1209 has a first winding and a second winding, in which the sine wave output signal S25 outputted from the second low-pass filter 1208 is an input of the first winding and an alternating current voltage Vac set in accordance with a turns ratio is an output of the second winding.

The alternating current voltage Vac is superimposed upon a direct current voltage Vdc outputted from the direct current voltage output portion 1250 to form an output voltage Vout, to be applied to the charging roll 12 that charges the surface of the photoconductive drum 11. At this time, the alternating current Iac by the alternating current voltage Vac and the direct current Idc by the direct current voltage Vdc are superimposed to form an output current Iout that flows on the surface of the photoconductive drum 11 through the charging roll 12.

The alternating current detecting circuit 1210 detects (monitors) the alternating current Iac flowing on the surface of the photoconductive drum 11 through the charging roll 12, and outputs the voltage signal S12 that indicates a voltage converted to be proportional to the alternating current Iac.

The alternating current voltage detecting circuit 1211 detects (monitors) the alternating current voltage Vac applied to the charging roll 12, and outputs a voltage signal S14 that is proportional to the alternating current voltage Vac.

In FIG. 2, the voltage signal S12 outputted by the alternating current detecting circuit 1210 is inputted to the amplifying circuit 1202. This performs control (current control) so that a difference between a value set by the controller 60 by means of the alternating current setting signal S1 and the outputted alternating current Iac becomes smaller.

It should be noted that the voltage signal S14 outputted from the alternating current voltage detecting circuit 1211 is not supplied to any circuits or portions. In a case where the voltage signal S14 is inputted to the amplifying circuit 1202 together with the voltage signal S12 outputted from the alternating current detecting circuit 1210 and the alternating current voltage Vac becomes larger than a predetermined value, the alternating current voltage Vac may be controlled to be smaller. In other words, the alternating current voltage detecting circuit 1211 may be used for overvoltage control.

Moreover, instead of the voltage signal S12 outputted by the alternating current detecting circuit 1210, the voltage signal S14 outputted by the alternating current voltage detecting circuit 1211 may be inputted to the amplifying circuit 1202. Then, the alternating current setting signal S1 outputted by the control signal generation portion 61 may be made to be the signal for setting the value of the alternating current voltage Vac, and control (voltage control) may be performed so that a difference between the value set by the alternating current setting signal S1 and the outputted alternating current voltage Vac becomes smaller.

At this time, in a case where the voltage signal S12 outputted by the alternating current detecting circuit 1210 is inputted to the amplifying circuit 1202 together with the voltage signal S14 outputted from the alternating current voltage detecting circuit 1211 and the alternating current Iac becomes larger than a predetermined value, the alternating current Iac may be controlled to be smaller. In other words, the alternating current detecting circuit 1210 may be used for overcurrent control.

In the case where the bias power supply device 100 is applied to the developing bias power supply 14a, the alternating current voltage output portion 1200 may perform voltage control.

[Circuit Configuration of Charging Bias Power Supply 12a]

Figure 3:
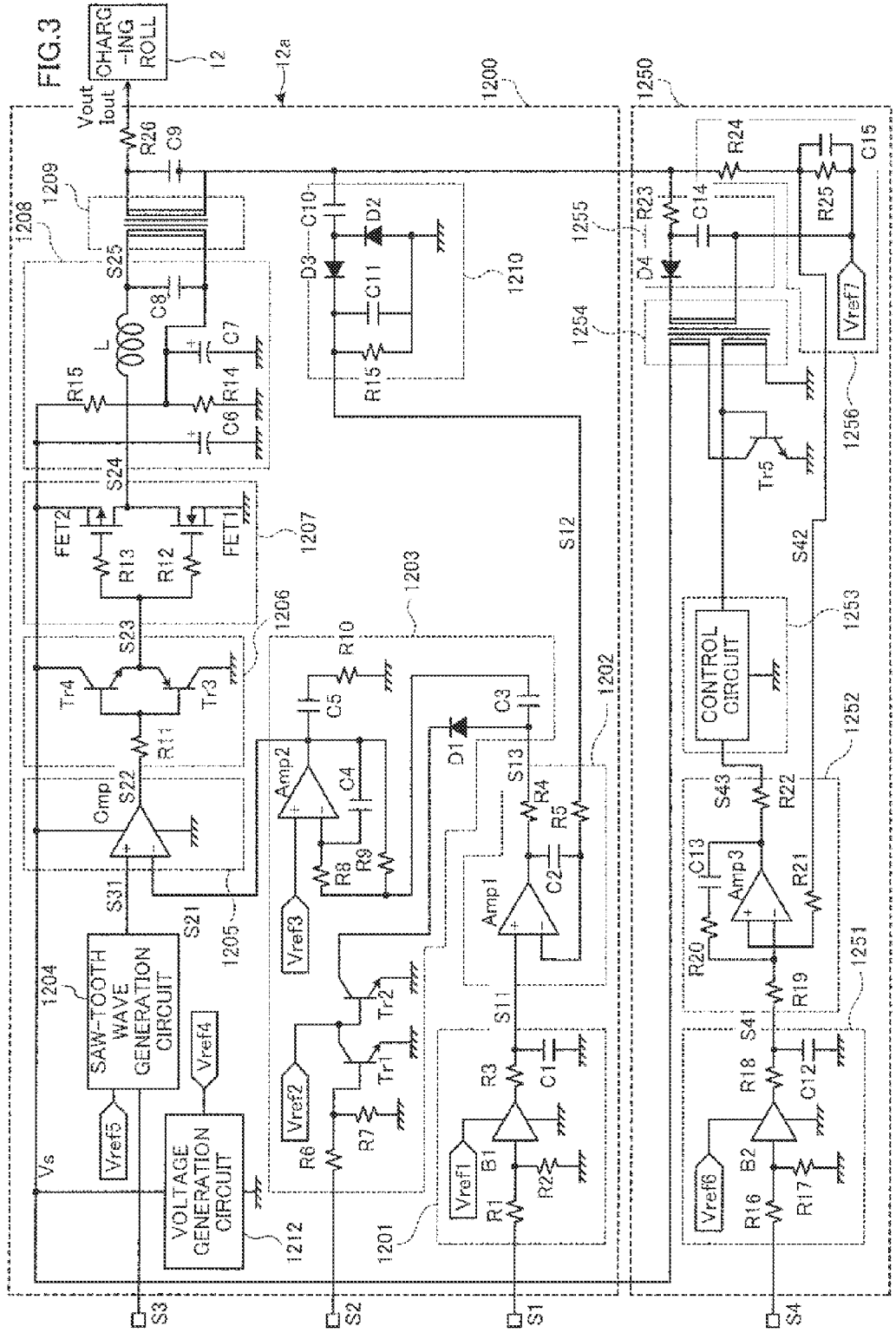
FIG. 3 is a diagram showing an example of a circuit configuration of a charging bias power supply.

FIG. 3 is a diagram showing an example of a circuit configuration of the charging bias power supply 12a.

It should be noted that arrangement of each circuit in FIG. 3 is different from the arrangement in FIG. 2 for ease of explanation. FIG. 3 schematically indicates each circuit, and therefore, the arrangement of each circuit is not limited thereto.

(Alternating Current Voltage Output Portion 1200)

First, the alternating current voltage output portion 1200 will be described.

The analogue voltage conversion circuit 1201 includes a buffer B1, resistances R1, R2 and R3, and a condenser C1.

An input terminal of the analogue voltage conversion circuit 1201 is one of terminals of the resistance R1, and the alternating current setting signal S1 transmitted by the control signal generation portion 61 is inputted thereto. The other terminal of the resistance R1 is connected to an input terminal of the buffer B1. Further, the input terminal of the buffer B1 is also connected to one of terminals of the resistance R2. The other terminal of the resistance R2 is grounded (ground potential is indicated as GND).

An output terminal of the buffer B1 is connected to one of terminals of the resistance R3. The other terminal of the resistance R3 is an output terminal of the analogue voltage conversion circuit 1201 to output the analogue voltage signal S11. Further, the other terminal of the resistance R3 is connected to one of terminals of the condenser C1. The other terminal of the condenser C1 is grounded (ground potential is indicated as GND).

A reference potential Vref1 and the ground potential GND are supplied to the buffer B1.

It should be noted that the buffer B1 shapes deformation of the waveform of the inputted alternating current setting signal S1.

When the alternating current setting signal S1, which is a PWM signal, is inputted to the analogue voltage conversion circuit 1201, the buffer B1 shapes the alternating current setting signal S1, and the condenser C1 is charged to a potential between the reference potential Vref1 and the ground potential GND according to the shaped alternating current setting signal S1. This potential is determined by the duty ratio of the alternating current setting signal S1. In other words, the larger the duty ratio, the higher the potential of the condenser C1, whereas the smaller the duty ratio, the lower the potential of the condenser C1.

The analogue voltage conversion circuit 1201 converts the alternating current setting signal S1, which is a PWM signal, into the analogue voltage signal S11 set according to the analogue voltage.

The amplifying circuit 1202 includes an error amplifier Amp1, resistances R4 and R5, and a condenser C2.

A non-inverting input terminal (hereinafter, represented as a + input terminal) of the error amplifier Amp1 is connected to the other terminal of the resistance R3, which is the output terminal of the analogue voltage conversion circuit 1201, and the analogue voltage signal S11 is inputted thereto. An inverting input terminal (hereinafter, represented as a − input terminal) of the error amplifier Amp1 is connected to one of terminals of the resistance R5. The other terminal of the resistance R5 is connected to the alternating current detecting circuit 1210, and the voltage signal S12 is inputted thereto.

An output terminal of the error amplifier Amp1 is connected to one of terminals of the resistance R4. The other terminal of the resistance R4 is an output terminal of the amplifying circuit 1202. The condenser C2 is connected between the − input terminal of the error amplifier Amp1 and the output terminal of the error amplifier Amp1.

The error amplifier Amp1 outputs the error amplifying signal S13 formed by amplifying a difference in potential between the analogue voltage signal S11 and the voltage signal S12.

The first low-pass filter 1203 includes an error amplifier Amp2, NPN transistors Tr1 and Tr2, resistances R6, R7, R8, R9 and R10, a diode D1, and condensers C3, C4 and C5.

One of terminals of the resistance R6 is an input terminal of the first low-pass filter 1203, and the output frequency setting signal S2 transmitted from the control signal generation portion 61 is inputted thereto. The other terminal of the resistance R6 is connected to a base terminal of the NPN transistor Tr1. An emitter terminal of the NPN transistor Tr1 is grounded, and a collector terminal thereof is connected to a base terminal of the NPN transistor Tr2. An emitter terminal of the NPN transistor Tr2 is grounded, and a collector terminal thereof is connected to a cathode terminal of the diode D1. A reference potential Vref2 is supplied to the collector terminal of the NPN transistor Tr1.

One of terminals of the resistance R7 is connected to the base terminal of the NPN transistor Tr1, and the other terminal thereof is grounded.

The NPN transistor Tr1 serves as an input buffer, and the NPN transistor Tr2 modulates, together with the diode D1, the error amplifying signal S13 by the output frequency setting signal S2.

It should be noted that the resistances R6 and R7 suppress flowing of the overcurrent into the NPN transistor Tr1.

The condenser C3 is a coupling condenser and extracts an alternating current component from the error amplifying signal S13 having been modulated by the output frequency setting signal S2.

The error amplifier Amp2, the resistances R8, R9 and R10, and the condensers C4 and C5 constitute a low-pass filter to interrupt a high-frequency component and generate the sine wave signal S21, which is a sine wave. Moreover, a reference potential Vref3 is supplied to a + input terminal of the error amplifier Amp2.

As will be described later, the amplitude (p-p value) of the sine wave signal S21 is set by the error amplifying signal S13, and the frequency of the sine wave signal S21 coincides with a repetition frequency of the output frequency setting signal S2.

The saw-tooth wave generation circuit 1204 receives the resonance frequency signal S3 transmitted by the control signal generation portion 61 as an input, and outputs the saw-tooth wave signal S31. The repetition frequency of the saw-tooth wave signal S31 coincides with the repetition frequency of the resonance frequency signal S3.

The circuit configuration of the saw-tooth wave generation circuit 1204 in the exemplary embodiment will be described later.

Here, a voltage generation circuit 1212 not indicated in FIG. 2 will be described. The voltage generation circuit 1212 generates a power supply potential Vs based on a reference potential Vref4. Then, the voltage generation circuit 1212 supplies the power supply potential Vs to the modulation circuit 1205, the FET driving circuit 1206, the switching circuit 1207 and the second low-pass filter 1208. It should be noted that the power supply potential Vs is, for example, 24V.

Next, the modulation circuit 1205 will be described.

The modulation circuit 1205 includes a comparator Cmp. A+ input terminal of the comparator Cmp is connected to the saw-tooth wave generation circuit 1204, and the saw-tooth wave signal S31 is inputted thereto. A− input terminal of the comparator Cmp is connected to the output terminal of the first low-pass filter 1203, and the sine wave signal S21 is inputted thereto. An output terminal of the comparator Cmp is connected to the FET driving circuit 1206 and outputs the modulation signal S22.

The comparator Cmp compares the potential of the sine wave signal S21 with the potential of the saw-tooth wave signal S31, and generates and outputs the modulation signal S22 whose potential becomes the power supply potential Vs during the period in which the potential of the saw-tooth wave signal S31 is higher than the potential of the sine wave signal S21, and becomes the ground potential GND during the period in which the potential of the saw-tooth wave signal S31 is lower than the potential of the sine wave signal S21. In other words, the modulation signal S22 is a PWM signal that has two potentials of the ground potential GND and the power supply potential Vs and a varying pulse width.

The FET driving circuit 1206 includes a PNP transistor Tr3, an NPN transistor Tr4 and a resistance R11.

One of terminals of the resistance R11 is an input terminal of the FET driving circuit 1206, and modulation signal S22 is inputted thereto. The other terminal of the resistance R11 is connected in common to a base terminal of the PNP transistor Tr3 and a base terminal of the NPN transistor Tr4. A collector terminal of the PNP transistor Tr3 is grounded, and a collector terminal of the NPN transistor Tr4 is connected to the power supply potential Vs. An emitter terminal of the PNP transistor Tr3 and an emitter terminal of the NPN transistor Tr4 are connected to provide an output terminal. The FET driving circuit 1206 outputs the driving signal S23.

It should be noted that the resistance R11 suppresses flowing of overcurrent into the PNP transistor Tr3 and the NPN transistor Tr4.

The modulation signal S22 inputted to the FET driving circuit 1206 is a PWM signal having two potentials of the ground potential GND and the power supply potential Vs. During a period in which the modulation signal S22 is at the ground potential GND, the PNP transistor Tr3 is turned on and the NPN transistor Tr4 is turned off, and thereby the driving signal S23 becomes the ground potential GND. In a period in which the modulation signal S22 is the power supply potential Vs, the PNP transistor Tr3 is turned off and the NPN transistor Tr4 is turned on, and thereby the driving signal S23 becomes the power supply potential Vs.

In other words, the driving signal S23 outputted by the FET driving circuit 1206 becomes a PWM signal that is in the same phase with the modulation signal S22 of the output terminal of the modulation circuit 1205. The FET driving circuit 1206 functions as a buffer circuit to supply current for driving the switching circuit 1207.

The switching circuit 1207 includes electric field effect transistors FET1 and FET2, and resistances R12 and R13.

One of terminals of the resistance R12 and one of terminals of the resistance R13 are connected to constitute an input terminal of the switching circuit 1207, and connected to the output terminal of the FET driving circuit 1206 (the emitter terminal of the PNP transistor Tr3 and the emitter terminal of the NPN transistor Tr4). The other terminal of the resistance R12 is connected to a gate terminal of the electric field effect transistor FET1 and the other terminal of the resistance R13 is connected to a gate terminal of the electric field effect transistor FET2. A source terminal of the electric field effect transistor FET1 is grounded, and a source terminal of the electric field effect FET2 is supplied with the power supply potential Vs. Further, a drain terminal of the electric field effect transistor FET1 and a drain terminal of the electric field effect transistor FET2 are connected to constitute an output terminal of the switching circuit 1207 and output the switching output signal S24.

The driving signal S23 inputted to the switching circuit 1207 is a PWM signal having two potentials of the ground potential GND and the power supply potential Vs. During a period in which the driving signal S23 is at the ground potential GND, the electric field effect transistor FET1 is turned off and the electric field effect transistor FET2 is turned on, and thereby the switching output signal S24 outputted by the switching circuit 1207 becomes the power supply potential Vs. On the other hand, in a period in which the driving signal S23 is the power supply potential Vs, the electric field effect transistor FET1 is turned on and the electric field effect transistor FET2 is turned off, and thereby the switching output signal S24 becomes the ground potential GND. In other words, the switching output signal S24 outputted by the switching circuit 1207 is a PWM signal whose potential is an inversion of the potential of the driving signal S23.

The second low-pass filter 1208 includes an inductance L, resistances R14 and R15, and condensers C6, C7 and C8.

One of terminals of the inductance L is connected to the output terminal of the switching circuit 1207 (the drain terminal of the electric field effect transistor FET1 and the drain terminal of the electric field effect transistor FET2), and the other terminal is connected to one of terminals of the first winding of the transformer 1209. The resistances R14 and R15 are connected in series between the power supply potential Vs and the ground potential GND. The connecting point (middle point) between the resistances R14 and R15 is connected to the other terminal of the first winding of the transformer 1209.

The condenser C8 connects between the one of the terminals of the first winding of the transformer 1209 and the other terminal thereof.

An LC circuit configured with the inductance L and the condenser C8 constitutes the low-pass filter.

Moreover, one of terminals of the condenser C7 is connected to a connecting point (middle point) between the resistances R14 and R15, and the other terminal is grounded. The condenser C7 suppresses fluctuations in the potential of the other terminal of the first winding of the transformer 1209.

The condenser C6 is provided between the power supply potential Vs and the ground potential GND and suppresses fluctuations in the power supply potential Vs.

The second low-pass filter 1208 converts the switching output signal S24, which is an inputted PWM signal, into the sine wave by passing through the low-pass filter, and outputs the sine wave output signal S25.

The first winding of the transformer 1209 is connected to the second low-pass filter 1208. Between one of the terminals of the second winding of the transformer 1209 and the other terminal, the condenser C9 is connected. The one of the terminals of the second winding is connected to the charging roll 12 through a resistance R26. The other terminal of the second winding is connected to the direct current voltage output portion 1250. Consequently, an output voltage Vout, which is provided by superimposing the alternating current voltage Vac outputted by the alternating current voltage output portion 1200 and the direct current voltage Vdc outputted by the direct current voltage output portion 1250, is applied to the charging roll 12 to charge the surface of the photoconductive drum 11. As described above, the output current Tout provided by superimposing the alternating current Iac and the direct current Idc flows in the photoconductive drum 11 through the charging roll 12.

The alternating current detecting circuit 1210 includes diodes D2 and D3, a resistance R15, and condensers C10 and C11.

One terminals of the condenser C10 is an input terminal of the alternating current detecting circuit 1210, and is connected to the other terminal of the second winding of the transformer 1209. The other terminal of the condenser C10 is connected to the cathode terminal of the diode D2 and the anode terminal of the diode D3. The anode terminal of the diode D2 is grounded. The cathode terminal of the diode D3 is connected to one of terminals of the resistance R15 and one of terminals of the condenser C11. The other terminal of the resistance R15 and the other terminal of the condenser C11 are grounded.

The cathode terminal of the diode D3, which is an output terminal of the alternating current detecting circuit 1210, is connected to the – input terminal of the error amplifier Amp1 of the amplifying circuit 1202 through the resistance R15.

The alternating current Iac to charge the photoconductive drum 11 is inputted to the alternating current detecting circuit 1210 through the condenser C10, and converted into a voltage by the resistance R15 and outputted as the voltage signal S12.

The voltage signal S12 is inputted to the – input terminal of the error amplifier Amp1 of the amplifying circuit 1202 through the resistance R5.

(Direct Current Voltage Output Portion 1250)

The direct current voltage output portion 1250, description of which is omitted in FIG. 2, includes an analogue voltage conversion circuit 1251, an amplifying circuit 1252, a control circuit 1253, a transformer 1254, a rectification circuit 1255 and a direct current voltage detecting circuit 1256.

Hereinafter, each circuit will be described.

The analogue voltage conversion circuit 1251 receives the direct current setting signal S4 transmitted from the control signal generation portion 61 as an input. The direct current setting signal S4 is a PWM signal, and sets a value of the direct current voltage Vdc outputted by the rectification circuit 1255 in accordance with the duty ratio.

Similar to the analogue voltage conversion circuit 1201 of the alternating current voltage output portion 1200, the analogue voltage conversion circuit 1251 includes a buffer B2, resistances R16, R17 and R18, and a condenser C12.

One of terminals of the resistance R16 is an input terminal of the analogue voltage conversion circuit 1251, and the direct current setting signal S4 transmitted from the controller 60 is inputted thereto. The other terminal of the resistance R16 is connected to an input terminal of the buffer B2. The input terminal of the buffer B2 is connected to one of terminals of the resistance R17. The other terminal of the resistance R17 is grounded.

An output terminal of the buffer B2 is connected to one of terminals of the resistance R18. The other terminal of the resistance R18 is an output terminal of the analogue voltage conversion circuit 1251 and outputs an analogue voltage signal S41. The other terminal of the resistance R18 is connected to one of terminals of the condenser C12. The other terminal of the condenser C12 is grounded.

Moreover, reference potential Vref6 is supplied to the buffer B2.

When the direct current setting signal S4, which is a PWM signal, is inputted to the analogue voltage conversion circuit 1251, the condenser C12 is charged to a potential between the reference potential Vref6 and the ground potential GND. This potential is determined in accordance with the duty ratio of the direct current setting signal S4. Consequently, the direct current setting signal S4, which is a PWM signal, is converted into the analogue voltage signal S41 of the analogue voltage.

The amplifying circuit 1252 includes an error amplifier Amp3, resistances R19, R20, R21 and R22, and a condenser C13.

One of terminals of the resistance R19 is an input terminal of the amplifying circuit 1252, and the analogue voltage signal S41 is inputted thereto from the analogue voltage conversion circuit 1251. The other terminal of the resistance R19 is connected to an − input terminal of the error amplifier Amp3. On the other hand, a + input terminal of the error amplifier Amp3 is connected to the direct current voltage detecting circuit 1256 that detects (monitors) direct current voltage Vdc through the resistance R21, and thereby a voltage signal S42 is inputted thereto.

The resistance R20 and the condenser C13 are connected in series, and a terminal on the resistance R20 side is connected to the − input terminal of the error amplifier Amp3. A terminal on the condenser C13 side is connected to an output terminal of the error amplifier Amp3.

The output terminal of the error amplifier Amp3 is connected to one of terminals of the resistance R22. The other terminal of the resistance R22 is an output terminal of the amplifying circuit 1252, and outputs an error amplifying signal S43 provided by amplifying a difference between the analogue voltage signal S41 and the voltage signal S42 by the error amplifier Amp3.

The control circuit 1253 controls a self-commutation transmitting operation of the transformer 1254, which will be described later, in accordance with the error amplifying signal S43, to thereby control the direct current voltage Vdc.

The transformer 1254 includes a first winding, a second winding, a first auxiliary winding and an NPN transistor Tr5. One of the terminals of the first winding is connected to the power supply potential Vs, and the other terminal is connected to a collector terminal of the NPN transistor Tr5. On the other hand, one of terminals of the first auxiliary winding is connected to a base terminal of the NPN transistor Tr5 and the control circuit 1253, and the other terminal thereof is grounded. Further, an emitter terminal of the NPN transistor Tr5 is grounded.

Both terminals of the second winding of the transformer 1254 are connected to the rectification circuit 1255.

The control circuit 1253 serves as a switch that causes a signal for turning on and off the NPN transistor Tr5 to be generated at the first auxiliary winding of the transformer 1254.

The rectification circuit 1255 includes a diode D4, a resistance R23 and a condenser C14. A cathode terminal of the diode D4 is connected to one of terminals of the second winding of the transformer 1254, and an anode terminal thereof is connected to one of terminals of the resistance R23 and one of terminals of the condenser C14. The other terminal of the resistance R23 is connected to the other terminal of the transformer 1209 of the alternating current voltage output portion 1200. Moreover, the other terminal of the condenser C14 is connected to the other terminal of the second winding of the transformer 1254.

The rectification circuit 1255 converts a voltage having rectangular wave that is induced by the second winding into negative (−) direct current voltage Vdc.

The direct current voltage detecting circuit 1256 includes resistances R24 and R25, and a condenser C15.

The resistance R25 and the condenser C15 are connected in parallel, and one of terminals of parallel connection is connected to the other terminal of the resistance R23, which is the output terminal of the rectification circuit 1255, through the resistance R24. Moreover, the other terminal of the parallel connection is connected to the other terminal of the condenser C 14 of the rectification circuit 1255. A reference potential Vref7 is supplied to the other terminal of the parallel connection.

It should be noted that the reference potential Vref7 prevents the potential of the + input terminal of the error amplifier Amp3 of the amplifying circuit 1252 from becoming negative.

The direct current voltage Vdc is divided by the resistances R24 and R25. Accordingly, the direct current voltage detecting circuit 1256 detects (monitors) the voltage appearing in the resistance R25, and outputs thereof as the voltage signal S42. The voltage signal 42 is inputted to the + input terminal of the error amplifier Amp3 of the amplifying circuit 1252 through the resistance R21.

In other words, the direct current voltage output portion 1250 is subjected to the voltage control.

(Saw-Tooth Wave Generation Circuit 1204)

Next, the saw-tooth wave generation circuit 1204 that generates the saw-tooth wave signal S31 will be described.

Figure 4:
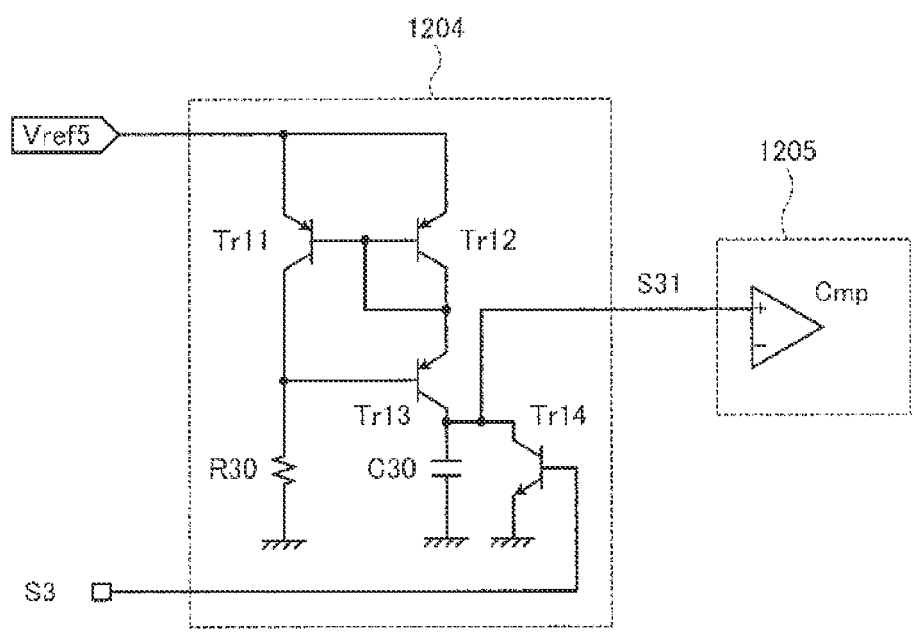
FIG. 4 is a diagram showing an example of a saw-tooth wave generation circuit.

FIG. 4 is a diagram showing an example of the saw-tooth wave generation circuit 1204.

The saw-tooth wave generation circuit 1204 shown in FIG. 4 includes PNP transistors Tr11, Tr12 and Tr13, an NPN transistor Tr14, a resistance R30, and a condenser C30.

A collector terminal of the PNP transistor Tr11 and one of terminals of the resistance 30 are connected to each other. The other terminal of the resistance 30 is grounded (ground potential is indicated as GND).

An emitter terminal of the PNP transistor Tr11 and an emitter terminal of the PNP transistor Tr12 are connected to each other, and the reference potential Vref5 is supplied thereto.

A collector terminal of the PNP transistor Tr12 is connected to an emitter terminal of the PNP transistor Tr13. Further, a collector terminal of the PNP transistor Tr13 is connected to one of terminals of the condenser C30. The other terminal of the condenser C30 is grounded. The collector terminal of the PNP transistor Tr13 is connected to a collector terminal of the NPN transistor Tr14.

A base terminal of the PNP transistor Tr11 and a base terminal of the PNP transistor Tr12 are connected to each other, and these base terminals are connected to a connecting point between the collector terminal of the PNP transistor Tr12 and the emitter terminal of the PNP transistor Tr13.

Further, the base terminal of the PNP transistor Tr13 is connected to a connecting point between the collector terminal of the PNP transistor Tr11 and the one of the terminal of the resistance R30.

Still further, an emitter terminal of the NPN transistor Tr14 is grounded. Then, the resonance frequency signal S3 transmitted from the control signal generation portion 61 is inputted to a base terminal of the NPN transistor Tr14.

On the other hand, a connecting point between the collector terminal of the PNP transistor Tr13 and the collector terminal of the NPN transistor Tr14 serves as an output terminal of the saw-tooth wave generation circuit 1204, and is connected to the + input terminal of the comparator Cmp of the modulation circuit 1205 to output the saw-tooth wave signal S31.

A mirror circuit is configured with the PNP transistors Tr11 and Tr12. During a period in which the resonance frequency signal S3 is at the ground potential GND, the NPN transistor Tr14 is turned off. Consequently, since the condenser C30 is charged through the PNP transistors Tr12 and Tr13, the potential of the saw-tooth wave signal S31 gradually increases (rises). It should be noted that rising in the saw-tooth wave signal S31 is set by a time constant determined by the condenser C30 and the resistance R30. On the other hand, when the resonance frequency signal S3 becomes a positive potential (the high-level potential "H" in FIG. 5 to be described later), the NPN transistor Tr14 is turned on by the rising edge from the ground potential GND. This causes the condenser C30 to start discharge, and thereby falling of the saw-tooth wave signal S31 is set.

It should be noted that the repetition frequency of the resonance frequency signal S3 and the repetition frequency of the saw-tooth wave signal S31 coincide with each other. The repetition frequency of the resonance frequency signal S3 and the saw-tooth wave signal S31 is, for example, 50 kHz to 100 kHz.

As described above, the rising of the saw-tooth wave signal S31 is determined by the time constant determined by the condenser C30 and the resistance R30. The capacity value of the condenser C30 varies depending upon temperature. The capacity value of the condenser C30 becomes larger as the temperature rises, and becomes smaller as the temperature falls.

In other words, the time constant determined by the condenser C30 and the resistance R30 becomes larger as the temperature rises, and becomes smaller as the temperature falls with respect to the time constant at a predetermined temperature.

From this, in the saw-tooth wave signal S31, the time required to reach a predetermined potential (peak potential) in the rising becomes longer as the temperature rises, and becomes shorter as the temperature falls relative to a required time at a predetermined temperature.

Consequently, in the exemplary embodiment, the frequency of the resonance frequency signal S3 transmitted from the control signal generation portion 61 to the saw-tooth wave generation circuit 1204 is changed according to the temperature, to thereby suppress fluctuations in the peak potential of the saw-tooth wave signal S31. This will be described in detail later.

As described above, the bias power supply device 100 is configured.

[Operations of Bias Power Supply Device 100]

Next, basic operations of the bias power supply device 100 will be described. Here, description will be given on the assumption that the bias power supply device 100 is applied to the charging bias power supply 12a.

Figure 5:
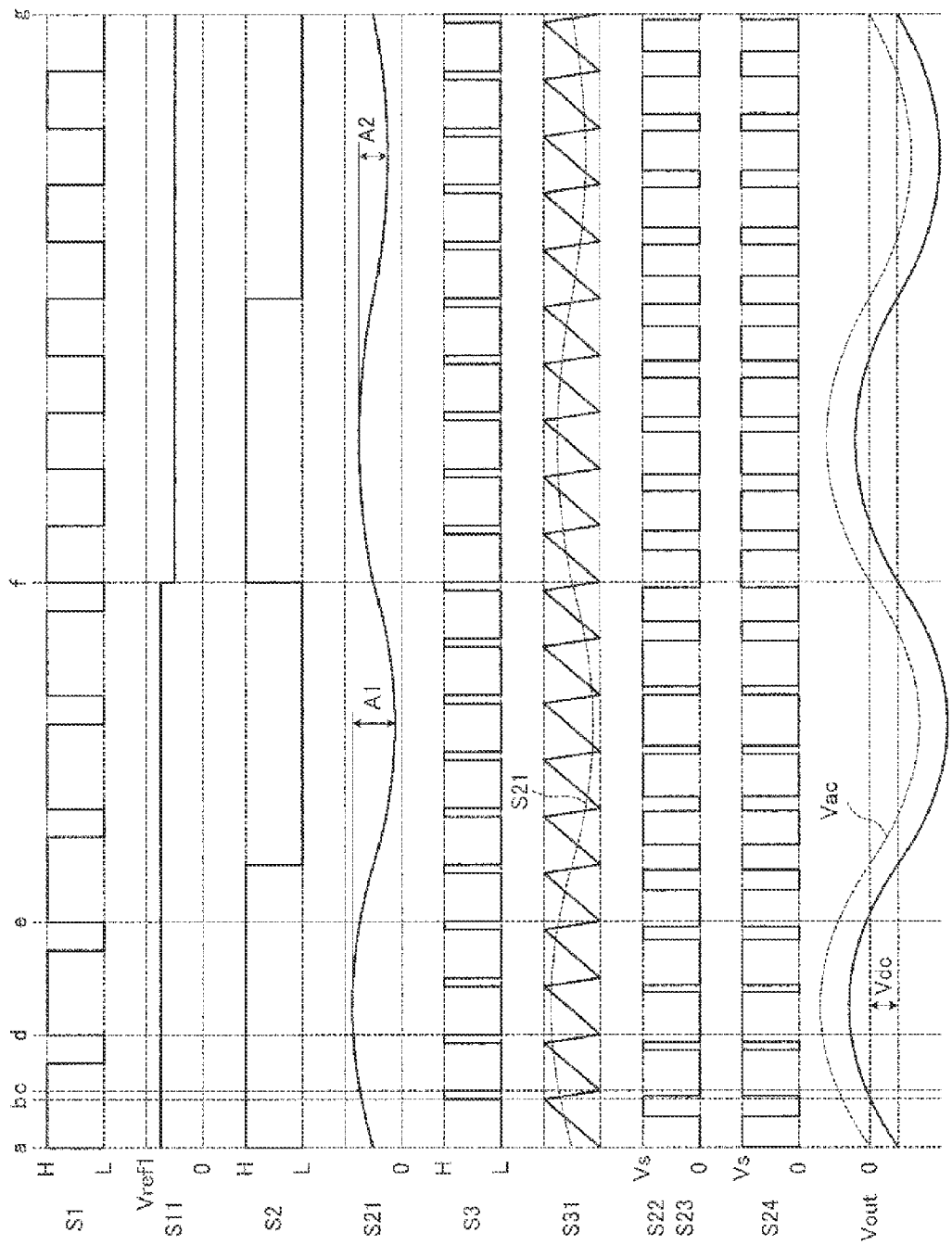
FIG. 5 is a timing chart illustrating operations of the bias power supply device.

FIG. 5 is a timing chart illustrating operations of the bias power supply device 100. In FIG. 5, the alternating current setting signal S1, the analogue voltage signal S11, the output frequency setting signal S2, the sine wave signal S21, the resonance frequency signal S3, the saw-tooth wave signal S31, the modulation signal S22 (driving signal S23), the switching output signal S24 and the output voltage Vout are indicated. It should be noted that the modulation signal S22 and the driving signal S23 have the same waveform; therefore, represented as the modulation signal S22 (driving signal S23). The ground potential GND is represented as "0".

Hereinafter, operations of the bias power supply device 100 will be described based on FIG. 5 with reference to FIGS. 3 and 4.

It should be noted that, in FIG. 5, as indicated by a time point a, a time point b, a time point c, and so on, it is assumed that the time passes in alphabetical order.

The alternating current setting signal S1 is transmitted from the control signal generation portion 61 to the charging bias power supply 12a. The alternating current setting signal S1 has two values of a low-level (hereinafter, represented as "L") and a high-level (hereinafter, represented as "H"), and is a PWM signal in which an "L" period of time and an "H" period of time during one cycle are set based on a predetermined ratio (duty ratio). For example, "L" is the ground potential GND (0V), and "H" is, for instance, 5V as a potential of a logical level. The value of the alternating current Iac is set by this duty ratio.

In FIG. 5, the alternating current setting signal S1 is indicated on the assumption that the period of time from the time point a to the time point d is one cycle, the duty ratio during the period of time from the time point a to the time point f is 75%, and the duty ratio during the period of time from the time point f to the time point g is 50%.

The analogue voltage signal S11 is generated by the analogue voltage conversion circuit 1201 to which the alternating current setting signal S1 has been inputted. As described in FIG. 3, the analogue voltage conversion circuit 1201 generates the analogue voltage signal S11 by causing the condenser C1 to be charged by the alternating current setting signal S1.

Accordingly, the analogue voltage signal S11 is set to a potential which is 75% of the reference potential Vref1 during a period of time from the time point a to the time point f, when the duty ratio of the alternating current setting signal S1 is 75%, and to a potential which is 50% of the reference potential Vref1 during a period of time from the time point f to the time point g, when the duty ratio is 50%. That is, the analogue voltage signal S11 is an analogue signal whose potential is set by the duty ratio of the alternating current setting signal S1.

The output frequency setting signal S2 is transmitted from the control signal generation portion 61 to the charging bias power supply 12a. The output frequency setting signal S2 has two values of "L" and "H", the duty ratio thereof is 50%, and the repetition frequency thereof is the frequency of the alternating current voltage Vac and the alternating current Iac.

As shown in FIG. 3, the output frequency setting signal S2 is inputted to the base terminal of the NPN transistor Tr1 of the first low-pass filter 1203 through the resistance R6. During the period of time when the output frequency setting signal S2 is at "L", the NPN transistor Tr1 is turned off and the collector terminal of the NPN transistor Tr1 is at the reference potential Vref2, whereas, during the period of time of "H", the NPN transistor Tr1 is turned on and is at the ground potential GND. Here, the reference potential Vref2 is a positive potential, and is, for example, 5V.

The collector terminal of the NPN transistor Tr1 is connected to the base terminal of the NPN transistor Tr2. Accordingly, during the period of time when the collector terminal is at the reference potential Vref2 (period of time when the output frequency setting signal S2 is at "L"), the NPN transistor Tr2 is turned on and the collector terminal of the NPN transistor Tr2 is at the ground potential GND. On the other hand, during the period of time when the collector terminal of the NPN transistor Tr1 is at the ground potential GND (period of time when the output frequency setting signal S2 is at "H"), since the NPN transistor Tr2 is turned off, the collector terminal of the NPN transistor Tr2 is in a floating state.

Here, the error amplifying signal S13, which is an output of the amplifying circuit 1202, will be considered. The error amplifying signal S13 is a signal formed by amplifying a difference in potential between the analogue voltage signal S11 and the voltage signal S12 outputted by the alternating current detecting 1210.

When the error amplifying signal S13 is inputted to the first low-pass filter 1203, the error amplifying signal S13 is modulated by the diode D 1. During the period of time when the collector terminal of the NPN transistor Tr2 is at the ground potential GND (period of time when the output frequency setting signal S2 is at "L"), the diode D1 is at a forward bias, and accordingly, the error amplifying signal S13 is drawn to the ground potential GND. On the other hand, during the period of time when the collector terminal of the NPN transistor Tr2 is at the reference potential Vref2 (period of time when the output frequency setting signal S2 is at "H"), the diode D1 is not at a forward bias, and thereby the error amplifying signal S13 is maintained. In other words, when the error amplifying signal S13 is inputted to the first low-pass filter 1203, the error amplifying signal S13 becomes a signal modulate by the output frequency setting signal S2.

The error amplifying signal S13 modulated by the output frequency setting signal S2 becomes the sine wave signal S21 by passing through the low-pass filter configured with the error amplifier Amp2 or the like in the first low-pass filter 1203.

As shown in FIG. 5, the amplitude (p-p value) of the sine wave signal S21 is set by the error amplifying signal S13 (namely, the alternating current setting signal S1 shown in FIG. 5). In other words, the amplitude A1 during the period of time from the time point a to the time point f in which the duty ratio of the alternating current setting signal S1 is 75% becomes large (75/50=1.25 times) compared to the amplitude A2 during the period of time from the time point f to the time point g in which the duty ratio of the alternating current setting signal S1 is 50%. It should be noted that, here, description is given on the assumption that there is no effect of the voltage signal S12 outputted by the alternating current detecting circuit 1210.

Next, the saw-tooth wave signal S31 will be described.

As shown in FIGS. 3 and 4, the resonance frequency signal S3 is inputted to the saw-tooth wave generation circuit 1204 from the control signal generation portion 61.

As shown in FIG. 5, the resonance frequency signal S3 is a pulse signal having two values of "L" and "H". The period of time of "L" from the time point a to the time point b corresponds to the rising of the saw-tooth wave signal S31, whereas the period of time of "H" from the time point b to the time point c corresponds to the falling of the saw-tooth wave signal S31. The period of time (one cycle) from the time point a to the time point c is repeated.

One cycle (period of time from the time point a to the time point c) of the resonance frequency signal S3 is assumed to be shorter than any of one cycle (period of time from the time point a to the time point d) of the alternating current setting signal S1 and one cycle (period of time from the time point a to the time point f) of the output frequency setting signal S2. In other words, the repetition frequency of the resonance frequency signal S3 is the highest, the frequency of the alternating current setting signal S1 is the next highest, and the frequency of the output frequency setting signal S2 is the lowest.

The cycle of the resonance frequency signal S3 is 1/10 of the cycle of the output frequency setting signal S2, and the frequency of the resonance frequency signal S3 is an integral multiple of the frequency of the output frequency setting signal S2. With this, interference occurring between the resonance frequency signal S3 having the highest frequency and the output frequency setting signal S2 is suppressed, and thereby noise generation is suppressed. Consequently, deterioration in the quality of image to be formed is suppressed.

It should be noted that the cycle of the alternating current setting signal S1 is 1/5 of the cycle of the output frequency setting signal S2 and the cycle of the resonance frequency signal S3 is 1/2 of the cycle of the alternating current setting signal S1, and accordingly, there is a relationship of an integral multiple; however, the frequency of the alternating current setting signal S1 may not be required to have a relationship of an integral multiple with respect to any of the frequency of the resonance frequency signal S3 and the frequency of the output frequency setting signal S2.

As shown in FIG. 4, during the period of time from the time point a to the time point b in which the resonance frequency signal S3 is at "L", electrical charge is accumulated in the condenser C30 by the current flowing in the PNP transistor Tr12 and the PNP transistor Tr13, and the potential of the output terminal of the saw-tooth wave generation circuit 1204 (the connecting point between the collector terminal of the PNP transistor Tr13 and the collector terminal of the NPN transistor Tr14) becomes higher as the time passes. When the resonance frequency signal S3 moves from "L" to "H", the NPN transistor Tr14 is turned on and discharge of the electrical charge accumulated in the condenser C30 is started, and thereby the potential of the output terminal becomes lower toward the ground potential GND. When the resonance frequency signal S3 moves from "H" to "L" at the time point c, the NPN transistor Tr14 is turned off and the electrical charge is accumulated in the condenser C30 again, and thereby the potential of the output terminal becomes higher as the time passes. By repeating this, the saw-tooth wave signal S31 is generated.

The modulation signal S22 is an output signal of the modulation circuit 1205. The modulation circuit 1205 compares the potential of the sine wave signal S21 with the potential of the saw-tooth wave signal S31, and generates and outputs the modulation signal S22 which is at the power supply potential Vs during the period of time when the potential of the saw-tooth wave signal S31 is higher than the potential of the sine wave signal S21, and at the ground potential GND during the period of time when the potential of the saw-tooth wave signal S31 is lower than the potential of the sine wave signal S21. In FIG. 5, the sine wave signal S21 is indicated with a broken line superposed on the saw-tooth wave signal S31.

As can be learned from FIG. 5, the modulation signal S22 is a PWM signal whose pulse width is set dependent upon fluctuations in the potential of the sine wave signal S21.

It should be noted that, as described in FIG. 3, the FET driving circuit 1206 receives the modulation signal S22 as an input, and outputs the driving signal S23. The waveform of the driving signal S23 is the same as that of the modulation signal S22.

As shown in FIG. 3, the electric field effect transistors FET1 and FET2 of the switching circuit 1207 are alternately turned on and off by the driving signal S23. It should be noted that, as described above, during the period of time when the driving signal S23 is at the ground potential GND, the electric field effect transistor FET1 is turned off and the electric field effect transistor FET2 is turned on, and thereby the switching output signal S24 of the switching circuit 1207 is at the power supply potential Vs. On the other hand, during the period of time when the driving signal S23 is at the power supply potential Vs, the electric field effect transistor FET1 is turned on and the electric field effect transistor FET2 is turned off, and thereby the switching output signal S24 of the switching circuit 1207 is at the ground potential GND.

In other words, as shown in FIG. 5, the driving signal S23 and the switching output signal S24 are opposite in the relationship of potential.

From the output signal of the switching circuit 1207, the sine wave is extracted by the second low-pass filter 1208, and is transformed into the alternating current voltage Vac through the transformer 1209.

On the other hand, the direct current voltage output portion 1250 operates similarly. That is, the analogue voltage conversion circuit 1251 generates the analogue voltage signal S41 in which the potential thereof is set in accordance with the duty ratio of the direct current setting signal S4, and outputs thereof to the amplifying circuit 1252. The amplifying circuit 1252 amplifies the difference in potential between the analogue voltage signal S41 and the voltage signal S42 from the direct current voltage detecting circuit 1256, and outputs the error amplifying signal S43 to the control circuit 1253. The control circuit 1253 turns on and off the NPN transistor Try, to thereby induce the voltage at the second winding of the transformer 1254. The rectification circuit 1255 rectifies the induced voltage to output the direct current voltage Vdc.

Then, the output voltage Vout provided by superimposing the alternating current voltage Vac and the direct current voltage Vdc is outputted from the charging bias power supply 12a, and is applied to the charging roll 12. As described above, for example, the direct current voltage Vdc is −600V, and the alternating current voltage Vac has a frequency of 2 kHz and a p-p value of 2 kV. Then, as shown in FIG. 5, the output voltage Vout oscillates positively and negatively with the ground potential GND (0) interposed therebetween.

The output voltage Vout is applied to the charging roll 12. The output current Iout, in which the direct current Idc and the alternating current Iac are superimposed, flows from the charging roll 12 to the photoconductive drum 11.

On the other hand, as shown in FIG. 3, the alternating current detecting circuit 1210 detects (monitors) the alternating current Iac and converts thereof into the voltage to provide the voltage signal S12, and outputs the voltage signal S12 to the − input terminal of the error amplifier Amp1 in the amplifying circuit 1202 through the resistance R5. Then, the error amplifier Amp1 controls the amplitude of the sine wave signal S21 by amplifying the difference in potential between the analogue voltage signal S11 inputted to the + input terminal and the voltage signal S12 inputted to the − input terminal. In other words, in a case where the alternating current Iac is smaller than a value determined by the alternating current setting signal S1, the alternating current voltage Vac is increased so that the alternating current Iac is increased. On the other hand, in a case where the alternating current Iac is larger than a value determined by the alternating current setting signal S1, the alternating current voltage Vac is reduced so that the alternating current Iac is reduced. In this manner, control (current control) is performed so that the difference between the alternating current Iac and a value determined by the alternating current setting signal S1 is reduced.

Instead of performing this current control, supposing that the alternating current setting signal S1 is a signal for setting a value of the alternating current voltage Vac, and control (voltage control) may be performed so that the difference between the alternating current voltage Vac and a value determined by the alternating current setting signal S1 is reduced.

Likewise, the direct current voltage detecting circuit 1256 detects (monitors) the direct current voltage Vdc, and outputs the voltage signal S12 that is proportional to the direct current voltage Vdc to the + input terminal of the error amplifier Amp3 of the amplifying circuit 1252 through the resistance R21. Then, the error amplifier Amp3 performs control (voltage control) of a value of the direct current voltage Vdc by amplifying the difference in potential between the voltage signal S42 inputted to the + input terminal and the analogue voltage signal S41 inputted to the − input terminal.

In the exemplary embodiment, the frequency of the resonance frequency signal S3 is changed in response to temperature change in each mechanical portion. Hereinafter, description will be given to the change of the frequency of the resonance frequency signal S3 in response to temperature change.

FIGS. 6A to 6C are timing charts illustrating the operations of the bias power supply device 100 in a case where a temperature in the bias power supply device 100 becomes higher than a predetermined temperature. FIG. 6A shows the operations at a predetermined temperature; FIG. 6B shows the operations when the frequency of the resonance frequency signal S3 is not changed in the case where the temperature becomes higher than the predetermined temperature; and FIG. 6C shows the operations when the frequency of the resonance frequency signal S3 is reduced in the case where the temperature becomes higher than the predetermined temperature.

It should be noted that, in FIGS. 6A to 6C, the output frequency setting signal S2, the resonance frequency signal S3, the saw-tooth wave signal S31, the modulation signal S22 (driving signal S23), the switching output signal S24 and the output voltage Vout are indicated.

Since FIG. 6A is the same as FIG. 5, description thereof will be omitted. It should be noted that, in FIG. 6A, the frequency of the resonance frequency signal S3 is indicated to be six times larger than the frequency of the output frequency setting signal S2.

As shown in FIG. 6B, when the temperature in the bias power supply device 100 becomes higher than a predetermined temperature, the time constant determined by the resistance R30 and the condenser C30 in the saw-tooth wave generation circuit 1204 becomes larger. Accordingly, an inclination with respect to the time in the rising of the saw-tooth wave signal S31 is reduced. Therefore, in the case where the frequency of the resonance frequency signal S3 is not changed, the peak voltage Vph of the saw-tooth wave signal S31 becomes lower than the peak voltage Vp in the case of the predetermined temperature (Vph<Vp) (refer to FIG. 6A). Consequently, in the case where the temperature is higher than the predetermined temperature, a pulse width of the modulation signal S22 (driving signal S23), which is a PWM signal, becomes small compared to the case of the predetermined temperature (refer to FIG. 6A). Because of this, the pulse width of the switching output signal S24, which is a PWM signal, becomes large compared to the case of the predetermined temperature (refer to FIG. 6A), to thereby cause the amplitude of the alternating current voltage Vac to become larger than the amplitude of the alternating current voltage Vac in the case of the predetermined temperature (refer to FIG. 6A).

In other words, the alternating current voltage Vac results in fluctuations depending upon temperature change.

As a consequence, in the exemplary embodiment, as shown in FIG. 6C, the frequency of the resonance frequency signal S3 is set smaller so as to reduce a difference between the peak voltage Vp of the saw-tooth wave signal S31 at the predetermined temperature and the peak voltage Vphf of the saw-tooth wave signal S31 in the case of temperature higher than the predetermined temperature. In FIG. 6C, the frequency of the resonance frequency signal S3 is indicated to be five times larger than the frequency of the output frequency setting signal S2.

In this way, in the case of the temperature higher than the predetermined temperature, reduction of the pulse width of the modulation signal S22 (driving signal S23), which is a PWM signal, compared to the case of the predetermined temperature is suppressed. Consequently, increase of the pulse width of the switching output signal S24, which is a PWM signal, compared to the case of the predetermined temperature is suppressed, and thereby increase of the amplitude of the alternating current voltage Vac compared to the amplitude of the alternating current voltage Vac in the case of the predetermined temperature is suppressed.

In other words, fluctuations of the alternating current voltage Vac depending upon temperature change are suppressed.

It should be noted that the frequency of the output frequency setting signal S2 and the frequency of the resonance frequency signal S3 may be set to maintain the relationship of integral multiple with each other. This suppresses noise generation caused by interference between the output frequency setting signal S2 and the resonance frequency signal S3.

Figure 7A:
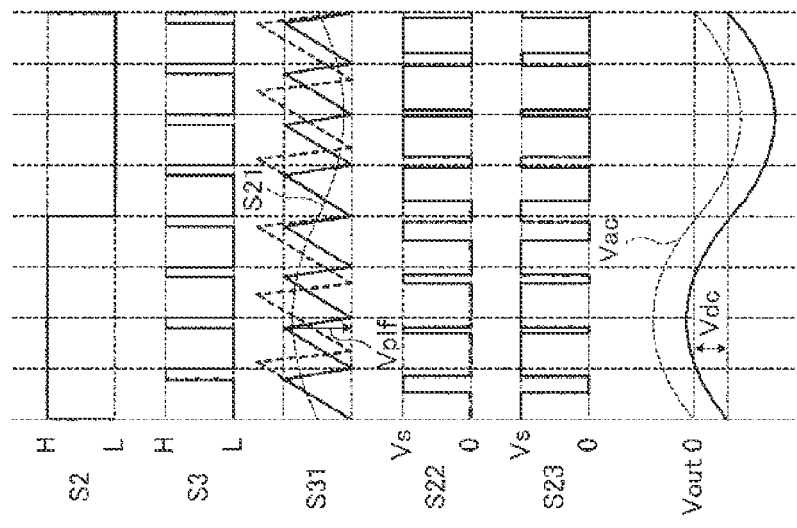
FIGS. 7A to 7C are timing charts illustrating the operations of the bias power supply device in a case where a temperature in the bias power supply device becomes lower than a predetermined temperature.
Figure 7B:
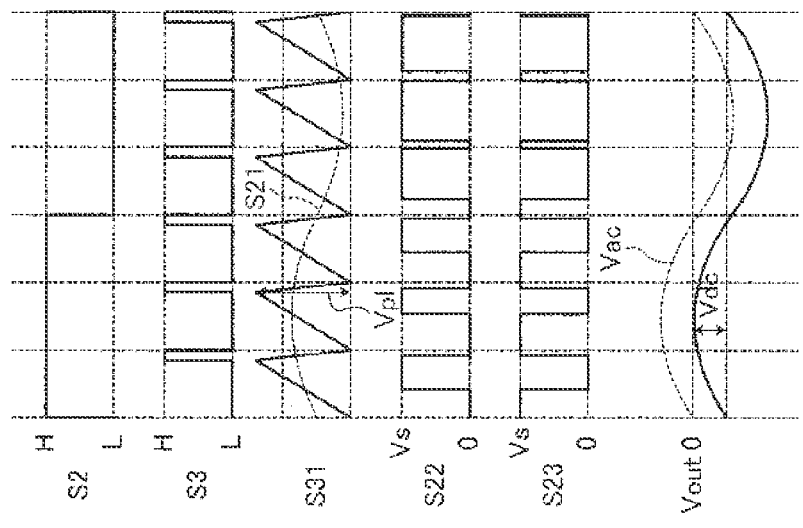
Figure 7C:
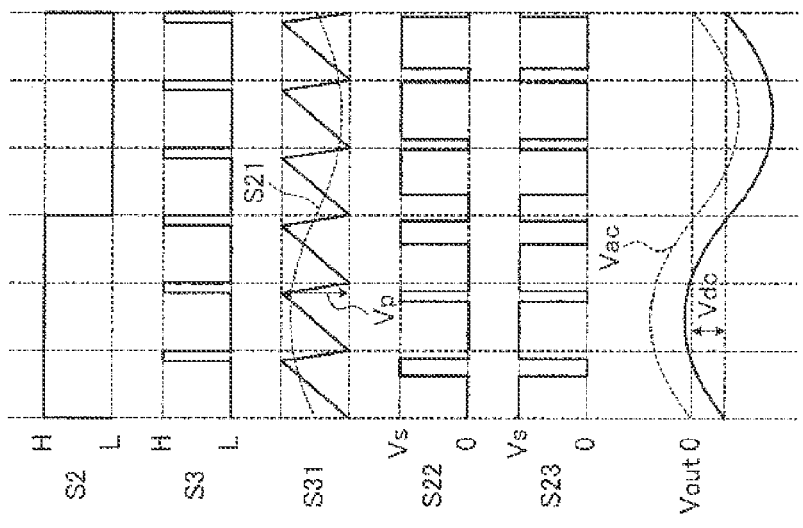

FIGS. 7A to 7C are timing charts illustrating the operations of the bias power supply device 100 in a case where a temperature in the bias power supply device 100 becomes lower than a predetermined temperature. FIG. 7A shows the operations at a predetermined temperature; FIG. 7B shows the operations when the frequency of the resonance frequency signal S3 is not changed in the case where the temperature becomes lower than the predetermined temperature; and FIG. 7C shows the operations when the frequency of the resonance frequency signal S3 is increased in the case where the temperature becomes lower than the predetermined temperature.

It should be noted that, in FIGS. 7A to 7C, similar to FIGS. 6A to 6C, the output frequency setting signal S2, the resonance frequency signal S3, the saw-tooth wave signal S31, the modulation signal S22 (driving signal S23), the switching output signal S24 and the output voltage Vout are indicated.

Since FIG. 7A is the same as those indicated in FIG. 6A, description thereof will be omitted.

As shown in FIG. 7B, when the temperature in the bias power supply device 100 becomes lower than a predetermined temperature, the time constant determined by the resistance R30 and the condenser C30 in the saw-tooth wave generation circuit 1204 becomes smaller. Accordingly, an inclination with respect to the time in the rising of the saw-tooth wave signal S31 is increased. Therefore, in the case where the frequency of the resonance frequency signal S3 is not changed, the peak voltage Vpl of the saw-tooth wave signal S31 becomes higher than the peak voltage Vp in the case of the predetermined temperature (Vp<Vpl) (refer to FIG. 7A). Consequently, in the case where the temperature is lower than the predetermined temperature, a pulse width of the modulation signal S22 (driving signal S23), which is a PWM signal, becomes large compared to the case of the predetermined temperature (refer to FIG. 7A). Because of this, the pulse width of the switching output signal S24, which is a PWM signal, becomes small compared to the case of the predetermined temperature (refer to FIG. 7A), to thereby cause the amplitude of the alternating current voltage Vac to become smaller than the amplitude of the alternating current voltage Vac in the case of the predetermined temperature.

In other words, the alternating current voltage Vac results in fluctuations depending upon temperature change.

As a consequence, in the exemplary embodiment, as shown in FIG. 7C, the frequency of the resonance frequency signal S3 is set smaller so as to reduce a difference between the peak voltage Vp of the saw-tooth wave signal S31 at the predetermined temperature and the peak voltage Vplf of the saw-tooth wave signal S31 in the case of temperature lower than the predetermined temperature. In FIG. 7C, the frequency of the resonance frequency signal S3 is indicated to be eight times larger than the frequency of the output frequency setting signal S2.

In this way, in the case of the temperature lower than the predetermined temperature, increase of the pulse width of the modulation signal S22 (driving signal S23), which is a PWM signal, compared to the case of the predetermined temperature (refer to FIG. 7A) is suppressed. Consequently, reduction of the pulse width of the switching output signal S24, which is a PWM signal, compared to the case of the predetermined temperature (refer to FIG. 7A) is suppressed, and thereby reduction of the amplitude of the alternating current voltage Vac compared to the amplitude of the alternating current voltage Vac in the case of the predetermined temperature is suppressed.

In other words, fluctuations of the alternating current voltage Vac depending upon the temperature change are suppressed.

It should be noted that the frequency of the output frequency setting signal S2 and the frequency of the resonance frequency signal S3 may be set to maintain the relationship of integral multiple with each other. This suppresses noise generation caused by interference between the output frequency setting signal S2 and the resonance frequency signal S3.

Here, the frequency of the resonance frequency signal S3 is changed in response to temperature change, to thereby suppress fluctuations of the peak voltage Vp of the saw-tooth wave signal S31. However, in the bias power supply device 100, as shown in FIGS. 2 and 3, current control is performed to suppress fluctuations of the alternating current voltage Iac by use of the voltage signal S12 outputted by the alternating current detecting circuit 1210 (refer to FIGS. 2 and 3). In addition, the bias power supply device 100 is capable of performing voltage control to suppress fluctuations of the alternating current voltage Vac by use of the voltage signal S14 outputted by the alternating current voltage detecting circuit 1211.

In other words, it is possible to control the alternating current voltage Vac or the alternating current Iac by use of the voltage signal S14 outputted by the alternating current voltage detecting circuit 1211 or the voltage signal S12 outputted by the alternating current detecting circuit 1210.

However, when the temperature changes, a gap between the value in the alternating current Iac or the alternating current voltage Vac designated by the alternating current setting signal 51 and the outputted value increases; therefore, the width of the control addressed by the current control or the voltage control becomes large.

In contrast, the width of the control addressed by the current control or the voltage control is reduced by changing the frequency of the resonance frequency signal S3 in response to temperature change.

FIG. 8 is a diagram showing an example of the reference table 62 for changing the repetition frequency of the resonance frequency signal S3 in response to the temperature T. Here, the temperature T in the bias power supply device 100 is divided into three temperature ranges and a repetition frequency of the resonance frequency signal S3 is prescribed for each of three temperature ranges, and thereby the repetition frequency of the resonance frequency signal S3 is set by the temperature range.

That is, in the case where the temperature T is 20° C. or more and less than 40° C. (20° C.≤T<40° C.), the frequency F1 (for example, 60 kHz) is assigned to the resonance frequency signal S3. In the case where the temperature T is 40° C. or more and 50° C. or less (40° C.≤T≤50° C.), the frequency F2 (for example, 54 kHz) is assigned to the resonance frequency signal S3. Then, in the case where the temperature T is 10° C. or more and less than 20° C. (10° C.≤T<20° C.), the frequency F3 (for example, 66 kHz) is assigned to the resonance frequency signal S3.

In the reference table 62, for example, the frequency F1 is stored in the memory address #1 in the memory installed in the controller 60, the frequency F2 is stored in the memory address #2, and the frequency F3 is stored in the memory address #3.

Accordingly, in the exemplary embodiment, the control signal generation portion 61 receives data related to the temperature T from the sensor 70 and determines the temperature range of the temperature T. In the case where the temperature T is 20° C. or more and less than 40° C. (20° C.≤T<40° C.), the control signal generation portion 61 accesses the memory address #1 in the memory to read the frequency F1. On the other hand, in the case where the temperature T is 40° C. or more and 50° C. or less (40° C.≤T≤50° C.), the control signal generation portion 61 accesses the memory address #2 in the memory to read the frequency F2. Moreover, in the case where the temperature T is 10° C. or more and less than 20° C. (10° C.≤T<20° C.), the control signal generation portion 61 accesses the memory address #3 in the memory to read the frequency F3.

Then, the control signal generation portion 61 sets the frequency of the resonance frequency signal S3 to any of the frequencies F1, F2 and F3 having been read, and transmits thereof to the saw-tooth wave generation circuit 1204 of the bias power supply device 100.

Here, the frequencies F1, F2 and F3 are set to be an integral multiple of the frequency of the output frequency setting signal S2. Consequently, noise generation caused by interference between the resonance frequency signal S3 and the output frequency setting signal S2 is suppressed.

It should be noted that, in FIG. 8, the temperature is divided into three temperature ranges; however, the temperature may be divided into two temperature ranges or four or more temperature ranges.

In the exemplary embodiment, it is assumed that the negative charge type toner is used; however, the positive charge type toner may be used. In this case, polarities of the direct current voltage Vdc of the bias power supply device 100 used as the charging bias power supply 12a and the direct current voltage Vdc of the bias power supply device 100 used as the developing bias power supply 14a may be set in reverse.

Further, in the exemplary embodiment, as shown in FIG. 5, it is assumed that the alternating current setting signal S1, the output frequency setting signal S2, the resonance frequency signal S3 and the direct current setting signal S4 transmitted from the controller 60 are signals having two potentials of "H" and "L". This is to make these signals hardly suffer noise effects from the outside when the signals are transmitted from the controller 60 to the bias power supply device 100 (the charging bias power supply 12a and/or the developing bias power supply 14a). Consequently, part of the signals transmitted by the controller 60 may be changed to the signals of analogue voltage (analogue signals), and part of the circuits (analogue voltage conversion circuits 1201, 1251 and the like) of the bias power supply device 100 (the charging bias power supply 12a and/or the developing bias power supply 14a) may be omitted.

Still further, the charging bias power supply 12a shown in FIG. 3 is merely an example; and the charging bias power supply 12a may have other circuit configuration. Similarly, the circuit configuration of the saw-tooth wave generation circuit 1204 shown in FIG. 4 is also a mere example; and other circuit configuration may be employed as long as the rising is set by the time constant determined by the condenser C30 and the resistance R30. Moreover, the saw-tooth wave signal S31 may not be limited to have the saw-tooth wave, but may have other waveform, such as a triangular wave, as long as the signal can be used for pulse-width modulation. Accordingly, the saw-tooth wave generation circuit 1204 may be a waveform generation circuit that generates other waveforms.

Further, in the exemplary embodiment, description is given on the assumption that the image forming apparatus 1 is of a multiple type. However, the image forming apparatus 1 may be of a tandem type having plural photoconductive drums corresponding to respective colors of yellow (Y), magenta (M), cyan (C), black (K) and so forth. In this case, the bias power supply device 100 described in the exemplary embodiment may be applied to a charging bias power supply that applies a charging bias to a charging roll provided corresponding to each photoconductive drum and/or a developing bias power supply that applies a developing bias to a developing unit provided corresponding to each photoconductive drum.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A bias power supply device comprising:
a temperature detecting unit that measures a temperature;
a control signal generation unit that generates and outputs an output frequency setting signal and a resonance frequency signal, the output frequency setting signal setting a frequency of an alternating current power in accordance with a repetition frequency, and the resonance frequency signal, in a case where the temperature measured by the temperature detecting unit corresponds to a higher temperature range of at least two predetermined temperature ranges, being set at a repetition frequency lower than a repetition frequency in a case of the measured temperature corresponding to a lower temperature range, and in a case where the temperature measured by the temperature detecting unit corresponds to the lower temperature range, being set at a repetition frequency higher than a repetition frequency in a case of the measured temperature corresponding to a higher temperature range;
a waveform signal generation circuit that generates a waveform signal to be used for pulse-width modulation, in which a time constant for rising is set by capacity and resistance based on the resonance frequency signal;
a modulation circuit that generates a modulation signal having been pulse-width modulated based on the waveform signal and the output frequency setting signal;
a switching circuit that is driven based on the modulation signal; and
a transformer provided with a first winding and a second winding, in which the switching circuit is connected to the first winding and a load provided outside is connected to the second winding, the transformer supplying an alternating current power with a repetition frequency of the output frequency setting signal to the load through the second winding.

2. The bias power supply device according to claim 1, wherein the control signal generation unit generates the resonance frequency signal having a repetition frequency that is an integral multiple of a repetition frequency of the output frequency setting signal.

3. The bias power supply device according to claim 2, further comprising a reference table prescribing a relation between the temperature and the repetition frequency of the resonance frequency signal,
wherein the control signal generation unit generates the resonance frequency signal having a repetition frequency obtained by reference to the reference table.

4. The bias power supply device according to claim 1, further comprising a reference table prescribing a relation between the temperature and the repetition frequency of the resonance frequency signal,
wherein the control signal generation unit generates the resonance frequency signal having a repetition frequency obtained by reference to the reference table.

5. An image forming apparatus comprising:
an image carrier;
a charging unit that charges the image carrier;
an exposure unit that exposes the image carrier charged by the charging unit and forms an electrostatic latent image on the image carrier;
a developing unit that develops the electrostatic latent image formed on the image carrier by exposing the image carrier;
a transfer unit that transfers an image formed by developing onto a transfer-receiving body; and
a fixing unit that fixes the transferred image on the transfer-receiving body,
wherein, at least one of the charging unit and the developing unit includes a bias power supply device comprising:
a temperature detecting unit that measures a temperature;
a control signal generation unit that generates and outputs an output frequency setting signal and a resonance frequency signal, the output frequency setting signal setting a frequency of an alternating current power in accordance with a repetition frequency, and the resonance frequency signal, in a case where the temperature measured by the temperature detecting unit corresponds to a higher temperature range of at least two predetermined temperature ranges, being set at a repetition frequency lower than a repetition frequency in a case of the measured temperature corresponding to a lower temperature range, and in a case where the temperature measured by the temperature detecting unit corresponds to the lower temperature range, being set at a repetition frequency higher than a repetition frequency in a case of the measured temperature corresponding to a higher temperature range;
a waveform signal generation circuit that generates a waveform signal to be used for pulse-width modulation, in which a time constant for rising is set by capacity and resistance based on the resonance frequency signal;
a modulation circuit that generates a modulation signal having been pulse-width modulated based on the waveform signal and the output frequency setting signal;
a switching circuit that is driven based on the modulation signal; and
a transformer provided with a first winding and a second winding, in which the switching circuit is connected to the first winding and a load provided outside is connected to the second winding, the transformer supplying an alternating current power with a repetition frequency of the output frequency setting signal to the load through the second winding.

6. The image forming apparatus according to claim 5, wherein the control signal generation unit generates the resonance frequency signal having a repetition frequency that is an integral multiple of a repetition frequency of the output frequency setting signal.

* * * * *